(12) United States Patent
Chen et al.

(10) Patent No.: US 12,540,996 B2
(45) Date of Patent: Feb. 3, 2026

(54) METHOD FOR ESTIMATING DIRECTION OF ARRIVAL OF SUB-ARRAY PARTITION TYPE L-SHAPED COPRIME ARRAY BASED ON FOURTH-ORDER SAMPLING COVARIANCE TENSOR DENOISING

(71) Applicant: Zhejiang University, Zhejiang (CN)

(72) Inventors: Jiming Chen, Zhejiang (CN); Hang Zheng, Zhejiang (CN); Chengwei Zhou, Zhejiang (CN); Zhiguo Shi, Zhejiang (CN)

(73) Assignee: Zhejiang University, Zhejiang (CN)

( * ) Notice: Subject to any disclaimer, the term of this patent is extended or adjusted under 35 U.S.C. 154(b) by 622 days.

(21) Appl. No.: 17/922,973

(22) PCT Filed: Oct. 29, 2021

(86) PCT No.: PCT/CN2021/127305
§ 371 (c)(1),
(2) Date: Nov. 3, 2022

(87) PCT Pub. No.: WO2023/070499
PCT Pub. Date: May 4, 2023

(65) Prior Publication Data
US 2023/0280433 A1    Sep. 7, 2023

(30) Foreign Application Priority Data
Oct. 28, 2021  (CN) .......................... 202111261630.0

(51) Int. Cl.
*G01S 3/14*  (2006.01)
(52) U.S. Cl.
CPC ..................... *G01S 3/143* (2013.01)
(58) Field of Classification Search
CPC ........................................................ G01S 3/14–70
See application file for complete search history.

(56) References Cited

U.S. PATENT DOCUMENTS

2013/0300596 A1  11/2013  Shirakawa
2022/0268883 A1*  8/2022  Wu ........................... G01S 3/14

FOREIGN PATENT DOCUMENTS

| CN | 104749552 | 7/2015 |
| CN | 111610485 | 9/2020 |

(Continued)

OTHER PUBLICATIONS

Xu, Feng & Vorobyov, Sergiy. (2021). Two-Dimensional DOA Estimation for L-shaped Nested Array via Tensor Modeling. 10.48550/arXiv.2104.06799 (Year: 2021).*

(Continued)

*Primary Examiner* — Cassi J Galt
(74) *Attorney, Agent, or Firm* — JCIPRNET

(57) ABSTRACT

Disclosed in the present invention is a method for estimating a direction of arrival of a sub-array partition type L-shaped coprime array based on fourth-order sampling covariance tensor denoising. The implementation steps are as follows: constructing an L-shaped coprime array partitioned with linear sub-arrays; modeling a receiving signal of the L-shaped coprime array and deriving a second-order cross-correlation matrix thereof; deriving a fourth-order covariance tensor based on the cross-correlation matrix; realizing fourth-order sampling covariance tensor denoising based on kernel tensor thresholding; deriving a fourth-order virtual domain signal based on denoised sampling covariance tensor; constructing a denoised structured virtual domain tensor; obtaining a direction of arrival estimation result by decomposing the structured virtual domain tensor. The present invention makes full use of the statistical distribution characteristics of the high-order tensor of the constructed sub-array partition type L-shaped coprime array, realizes high-precision two-dimensional direction of arrival estima- (Continued)

tion through denoised virtual domain tensor signal processing, and can be used for target positioning.

6 Claims, 3 Drawing Sheets

(56) References Cited

FOREIGN PATENT DOCUMENTS

| | | |
|---|---|---|
| CN | 111610486 | 9/2020 |
| CN | 112904272 | 6/2021 |
| CN | 113552532 | 10/2021 |

OTHER PUBLICATIONS

Tan et al., "Sparse direction of arrival estimation using co-prime arrays with off-grid targets", IEEE Signal Processing Letters, vol. 21 (1), pp. 26-29, 2014 (Year: 2014).*
"International Search Report (Form PCT/ISA/210) of PCT/CN2021/127305," mailed on Jul. 28, 2022, pp. 1-5.
"Written Opinion of the International Searching Authority (Form PCT/ISA/237) of PCT/CN2021/127305," mailed on Jul. 28, 2022, pp. 1-3.

* cited by examiner

METHOD FOR ESTIMATING DIRECTION OF ARRIVAL OF SUB-ARRAY PARTITION TYPE L-SHAPED COPRIME ARRAY BASED ON FOURTH-ORDER SAMPLING COVARIANCE TENSOR DENOISING

CROSS-REFERENCE TO RELATED APPLICATION

This application is a 371 of international application of PCT application serial no. PCT/CN2021/127305, filed on Oct. 29, 2021, which claims the priority benefit of China application no. 202111261630.0, filed on Oct. 28, 2021. The entirety of each of the above mentioned patent applications is hereby incorporated by reference herein and made a part of this specification.

TECHNICAL FIELD

The present invention belongs to the technical field of array signal processing, in particular to a statistical signal processing technology based on multi-dimensional sparse array high-order virtual domain statistics, in particular to a method for estimating a direction of arrival of a sub-array partition type L-shaped coprime array based on fourth-order sampling covariance tensor denoising, which can be used for target positioning.

DESCRIPTION OF RELATED ART

As a sparse array with a systematic structure, a coprime array has the advantages of a large aperture, high resolution, and high degree of freedom. It can break through the limitation of a Nyquist sampling rate and improve the comprehensive performance of direction of arrival estimation. In order to realize the direction of arrival estimation matching the Nyquist sampling rate in a coprime array scenario, a common practice is to derive a high-order statistical model from the received signal of the coprime array, and construct an augmented virtual uniform array to realize the direction of arrival estimation based on virtual domain signal processing. However, an existing method usually models the received signal as a vector and derives a virtual domain signal by vectorizing a received signal covariance matrix. In the scenario of deploying a multi-dimensional coprime array, since the received signal covers multi-dimensional space-time information, the processing method of vectorizing the signal loses original structural information of the received signal of the coprime array. As a multi-dimensional data type, a tensor can be used to represent complex electromagnetic information and preserve the original structure of the received signal, so it is gradually applied in the field of array signal processing. However, the existing tensor signal processing method is only effective under the premise of matching the Nyquist sampling rate, and has not yet involved high-order statistical analysis of coprime array sparse signals and virtual domain expansion.

As an important multi-dimensional signal feature extraction tool, tensor decomposition is highly sensitive to noise, while the traditional virtual domain derivation method based on higher-order signal statistics often introduces a complex noise term, which brings great challenges to the realization of the virtual domain expansion of the coprime array based on a tensor model. On the one hand, the traditional method derives the augmented virtual domain based on the autocorrelation statistics of the received signal, and the noise power introduced by the noise autocorrelation would interfere with the tensor statistics processing; on the other hand, the traditional method obtains high-order sampling covariance statistic based on the statistical calculation of the sampled signal, but introduces high-order sampling noise, which has a serious impact on the decomposition of the high-order covariance tensor. For this reason, how to overcome both the noise power and high-order sampling noise interference in the scenario of the multi-dimensional coprime array, derive the denoised virtual domain tensor, and realize high-precision two-dimensional direction of arrival estimation based on the denoised virtual domain tensor processing is still an urgent problem to be solved.

SUMMARY

The purpose of the present invention is to propose a method for estimating a direction of arrival of a sub-array partition type L-shaped coprime array based on fourth-order sampling covariance tensor denoising, aiming at the problems of a damage to a signal structure and noise term interference to high-order virtual domain statistics in an existing method. It provides a feasible idea and effective solution for realizing a high-precision two-dimensional direction of arrival estimation through high-order tensor statistics denoising processing.

The purpose of the present invention is realized through the following technical solutions: a method for estimating a direction of arrival of a sub-array partition type L-shaped coprime array based on fourth-order sampling covariance tensor denoising, wherein the method comprises the following steps:

(1) constructing a linear sub-array partition type L-shaped coprime array by a receiving end with $2M_{\mathbb{L}_1}+N_{\mathbb{L}_1}+2M_{\mathbb{L}_2}+N_{\mathbb{L}_2}-2$ physical antenna array elements, wherein the L-shaped coprime array consists of two coprime linear arrays $\mathbb{L}_i$, i=1, 2 located on an x axis and a y axis, and first array elements of the two coprime linear arrays $\mathbb{L}_1$ and $\mathbb{L}_2$ are laid out from a positions where the coordinates are 1 on the x axis and y axis respectively; the coprime linear array $\mathbb{L}_i$ contains $|\mathbb{L}_i|=2M_{\mathbb{L}_i}+N_{\mathbb{L}_i}-1$ array elements, and wherein $M_{\mathbb{L}_i}$ and $N_{\mathbb{L}_i}$ are a pair of coprime integers, $M_{\mathbb{L}_i} < N_{\mathbb{L}_i}$, $|\cdot|$ represents the potential of the set;

$$\{(x_{L_1}, 0)|x_{L_1} = [c_{L_1}^{(1)}, c_{L_1}^{(2)}, \ldots, c_{L_1}^{(|L_1|)}]d\} \text{ and}$$

$$\{(0, y_{L_2})|y_{L_2} = [c_{L_2}^{(1)}, c_{L_2}^{(2)}, \ldots, c_{L_2}^{(|L_2|)}]d\}$$

are respectively used to represent the position of each array element of the L-shaped coprime array on the x axis and y axis, wherein $$c_{L_1}^{(1)} = c_{L_2}^{(1)} = 1,$$

and a unit interval d is taken as half of the wavelength of an incident narrowband signal;

(2) assuming that there are K far-field narrow-band incoherent signal sources from $\{(\theta_1, \varphi_1), (\theta_2, \varphi_2), \ldots, (\theta_K, \varphi_K)\}$ directions, modeling a received signal of the coprime linear array $\mathbb{L}_i$ forming the L-shaped coprime array as follows:

$$X_{\mathbb{L}_i} = \sum_{k=1}^{K} a_{\mathbb{L}_i}(k) \circ s_k + N_{\mathbb{L}_i} \in \mathbb{C}^{|\mathbb{L}_i| \times T},$$

wherein, $s_k = [s_{k,1}, s_{k,2}, \ldots, s_{k,T}]^T$ is a multi-snapshot sampling signal waveform corresponding to a kth incident signal source, T is the number of sampling snapshots, ○ represents the outer product of the vector, $N_{\mathbb{L}_i}$ is noise independent of each signal source, $a_{\mathbb{L}_i}(k)$ is a steering vector of $\mathbb{L}_i$, and corresponds to a signal source having an incoming wave direction of $(\theta_k, \varphi_k)$ and is expressed as follows:

$$a_{\mathbb{L}_i}(k) = \left[ e^{-j\pi c_{\mathbb{L}_i}^{(1)} \mu_i(k)}, e^{-j\pi c_{\mathbb{L}_i}^{(2)} \mu_i(k)}, \ldots, e^{-j\pi c_{\mathbb{L}_i}^{(|\mathbb{L}_i|)} \mu_i(k)} \right]^T,$$

wherein, $\mu_1(k) = \sin(\varphi_k)\cos(\theta k)$, $\mu_2(k) = \sin(\varphi_k)\sin(\theta_k)$, $j = \sqrt{-1}$, $[\bullet]^T$ represents a transpose operation; a second-order cross-correlation matrix $R_{\mathbb{L}_1 \mathbb{L}_2} \in \mathbb{C}^{|\mathbb{L}_1| \times |\mathbb{L}_2|}$ is obtained by solving cross-correlation statistics of $X_{\mathbb{L}_1}$ and $X_{\mathbb{L}_2}$:

$$R_{\mathbb{L}_1 \mathbb{L}_2} = E\{X_{\mathbb{L}_1} X_{\mathbb{L}_2}^H\} = \sum_{k=1}^{K} \sigma_k^2 a_{\mathbb{L}_1}(k) \cdot a_{\mathbb{L}_2}^*(k),$$

and wherein, $$\sigma_k^2 = E\{s_k(t) s_k^*(t)\}$$

represents power of a kth incident signal source, $E\{\bullet\}$ represents a mathematical expectation operation, $(\bullet)^H$ represents a conjugate transpose operation, $(\bullet)^*$ represents a conjugate operation;

(3) calculating the autocorrelation of the second-order cross-correlation matrix $R_{\mathbb{L}_1 \mathbb{L}_2}$ to obtain a fourth-order covariance tensor $V \in \mathbb{C}^{|\mathbb{L}_1| \times |\mathbb{L}_2| \times |\mathbb{L}_1| \times |\mathbb{L}_2|}$:

$$\mathcal{V} = R_{\mathbb{L}_1 \mathbb{L}_2} \cdot R_{\mathbb{L}_1 \mathbb{L}_2}^* = E\{(X_{\mathbb{L}_1} X_{\mathbb{L}_2}^H) \cdot (X_{\mathbb{L}_1} X_{\mathbb{L}_2}^H)^*\}$$
$$= \sum_{k=1}^{K} \sigma_k^4 a_{\mathbb{L}_1}(k) \cdot a_{\mathbb{L}_2}^*(k) \cdot a_{\mathbb{L}_1}^*(k) \cdot a_{\mathbb{L}_2}(k);$$

wherein, in practice, the fourth-order covariance tensor may be approximated by a fourth-order sampling covariance tensor $\hat{\mathcal{V}} \in \mathbb{C}^{|\mathbb{L}_1| \times |\mathbb{L}_2| \times |\mathbb{L}_1| \times |\mathbb{L}_2|}$, that is:

$$\hat{\mathcal{V}} = \left( \frac{1}{T} X_{\mathbb{L}_1} X_{\mathbb{L}_2}^H \right) \cdot \left( \frac{1}{T} X_{\mathbb{L}_1} X_{\mathbb{L}_2}^H \right)^* =$$
$$\sum_{k=1}^{K} \left( \frac{1}{T} s_k^T s_k^* \right) a_{\mathbb{L}_1}(k) \cdot a_{\mathbb{L}_2}^*(k) \cdot a_{\mathbb{L}_1}^*(k) \cdot a_{\mathbb{L}_2}(k) + \mathcal{Z},$$

wherein:

$$\mathcal{Z} = \left[ \frac{1}{T} \sum_{k=1}^{K} a_{\mathbb{L}_1}(k) \cdot \left( s_k^T N_{\mathbb{L}_2}^H \right) + \frac{1}{T} \sum_{k=1}^{K} a_{\mathbb{L}_2}(k) \cdot \left( s_k^T N_{\mathbb{L}_1}^H \right) + \frac{1}{T} N_{\mathbb{L}_1} N_{\mathbb{L}_2}^H \right]$$

$$\left[ \frac{1}{T} \sum_{k=1}^{K} a_{\mathbb{L}_1}(k) \cdot \left( s_k^T N_{\mathbb{L}_2}^H \right) + \frac{1}{T} \sum_{k=1}^{K} a_{\mathbb{L}_2}(k) \cdot \left( s_k^T N_{\mathbb{L}_1}^H \right) + \frac{1}{T} N_{\mathbb{L}_1} N_{\mathbb{L}_2}^H \right]^*$$

is the fourth-order sampling noise tensor; the $(\tau_1, \varsigma_1, \tau_2, \varsigma_2)$th element in $\mathcal{Z}$ is represented as $\mathcal{Z}_{(\tau_1, \varsigma_1, \tau_2, \varsigma_2)}$, $\tau_1, \tau_2 = 1, 2, \ldots, |\mathbb{L}_1|$, $\varsigma_1, \varsigma_2 = 1, 2, \ldots, |\mathbb{L}_2|$, $\mathcal{Z}_{(\tau_1, \varsigma_1, \tau_2, \varsigma_2)}$ obeys an approximate complex Gaussian distribution, and an approximate variance thereof $\overline{\sigma}^2$ is expressed as:

$$\overline{\sigma}^2 = \frac{1}{T^2} \left[ \lambda_1 \left( \sigma_n^2 \sum_{k=1}^{K} \sigma_k^2 \right)^2 + \lambda_2 \sigma_n^6 \sum_{k=1}^{K} \sigma_k^2 + \lambda_3 \sigma_n^8 \right],$$

and wherein, $\lambda_1$, $\lambda_2$ and $\lambda_3$ represent a combined weight of three sub-variance terms $$\left( \sigma_n^2 \sum_{k=1}^{K} \sigma_k^2 \right)^2, \sigma_n^6 \sum_{k=1}^{K} \sigma_k^2$$

and $$\sigma_n^8, \sigma_n^2$$

represents the noise power;

(4) performing high-order singular value decomposition on the fourth-order sampling covariance tensor $\hat{\mathcal{V}}$:

$$\hat{\mathcal{V}} = \mathcal{S} \times_1 Y^{(1)} \times_2 Y^{(2)} \times_3 Y^{(3)} \times_4 Y^{(4)},$$

wherein, $\mathcal{S} \in \mathbb{C}^{|\mathbb{L}_1| \times |\mathbb{L}_2| \times |\mathbb{L}_1| \times |\mathbb{L}_2|}$ represents a kernel tensor, which contains projections from signal and noise components in $\hat{\mathcal{V}}$, $Y^{(1)} \in \mathbb{C}^{|\mathbb{L}_1| \times |\mathbb{L}_1|}$, $Y^{(2)} \in \mathbb{C}^{|\mathbb{L}_2| \times |\mathbb{L}_2|}$, $Y^{(3)} \in \mathbb{C}^{|\mathbb{L}_1| \times |\mathbb{L}_1|}$ and $Y^{(4)} \in \mathbb{C}^{|\mathbb{L}_2| \times |\mathbb{L}_2|}$ represent singular matrices corresponding to four dimensions of $\hat{\mathcal{V}}$; the thresholding is performed on $\mathcal{S}$, that is, elements in $\mathcal{S}$ that are less than or equal to a noise threshold $\epsilon$ are set to zero, and elements larger than the noise threshold $\epsilon$ are reserved, thus obtaining a thresholded kernel tensor $\mathcal{S}_{dn}$, where an element in $\mathcal{S}_{dn}$ is expressed as follows:

$$\mathcal{S}_{dn(\tau_1, \varsigma_1, \tau_2, \varsigma_2)} = \begin{cases} \mathcal{S}_{(\tau_1, \varsigma_1, \tau_2, \varsigma_2)} & |\mathcal{S}_{(\tau_1, \varsigma_1, \tau_2, \varsigma_2)}| > \epsilon, \\ 0 & |\mathcal{S}_{(\tau_1, \varsigma_1, \tau_2, \varsigma_2)}| \leq \epsilon, \end{cases}$$

and wherein, $\mathcal{S}_{(\tau_1, \varsigma_1, \tau_2, \varsigma_2)}$ represents a $(\tau_1, \varsigma_1, \tau_2, \varsigma_2)$th element of $\mathcal{S}$, the noise threshold $\epsilon$ is as follows:

$$\epsilon = \overline{\sigma} \sqrt{2 \log(|\mathbb{L}_1| |\mathbb{L}_2| |\mathbb{L}_1| |\mathbb{L}_2|)};$$

Further, the thresholded kernel tensor $\mathcal{S}_{dn}$ is multiplied with the four singular matrices $Y^{(1)}$, $Y^{(2)}$, $Y^{(3)}$ and $Y^{(4)}$ to obtain a denoised sampling covariance tensor $\hat{\mathcal{V}}_{dn}$, which is expressed as follows:

$$\hat{\mathcal{V}}_{dn} = \mathcal{S}_{dn} \times_1 Y^{(1)} \times_2 Y^{(2)} \times_3 Y^{(3)} \times_4 Y^{(4)};$$

(5) defining dimension sets $\mathbb{J}_1=\{1, 3\}$ and $\mathbb{J}_2=\{2, 4\}$, and obtaining a fourth-order virtual domain signal $\hat{\mathcal{V}}_\mathbb{W} \in \mathbb{C}^{|\mathbb{L}_1|^2 \times |\mathbb{L}_2|^2}$ by performing tensor transformation of dimension merging on the denoised sampling covariance tensor $\hat{\mathcal{V}}_{dn}$:

$$\hat{\mathcal{V}}_\mathbb{W} \triangleq \hat{\mathcal{V}}_{dn_{\{\mathbb{J}_1,\mathbb{J}_2\}}} = \sum_{k=1}^{K} \left(\frac{1}{T} s_k^T s_k^*\right) \left[a_{\mathbb{L}_1}^*(k) \otimes a_{\mathbb{L}_1}(k)\right] \cdot \left[a_{\mathbb{L}_2}(k) \otimes a_{\mathbb{L}_2}^*(k)\right],$$

wherein, for $$a_{\mathbb{L}_1}^*(k) \otimes a_{\mathbb{L}_1}(k) \text{ and } a_{\mathbb{L}_2}(k) \otimes a_{\mathbb{L}_2}^*(k),$$

by forming a difference set array on exponent terms respectively, augmented virtual linear arrays on the x axis and on the y axis are constructed, $\otimes$ representing the Kronecker product; $\hat{\mathcal{V}}_\mathbb{W}$ corresponds to a two-dimensional non-continuous virtual cross array $\mathbb{W}$, $\mathbb{W}$ contains a virtual uniform cross array $\mathbb{V} = \mathbb{V}_x \cup \mathbb{V}_y$, where $\mathbb{V}_x$ and $\mathbb{V}_y$ are respectively the virtual uniform linear arrays on the x axis and the y axis; positions of all virtual array elements in $\mathbb{V}_x$ and $\mathbb{V}_y$ are respectively expressed as $$\mathbb{V}_x = \{(x_\mathbb{V}, 0) | x_\mathbb{V} = [q_{\mathbb{V}_x}^{(1)}, q_{\mathbb{V}_x}^{(2)}, \ldots, q_{\mathbb{V}_x}^{(|\mathbb{V}_x|)}]d\} \text{ and}$$

$$\mathbb{V}_y = \{(0, y_\mathbb{V}) | y_\mathbb{V} = [q_{\mathbb{V}_y}^{(1)}, q_{\mathbb{V}_y}^{(2)}, \ldots, q_{\mathbb{V}_y}^{(|\mathbb{V}_y|)}]d\},$$

where $$q_{\mathbb{V}_K}^{(1)} = -M_{\mathbb{L}_1} N_{\mathbb{L}_1} - M_{\mathbb{L}_1} + 2,$$

$$q_{\mathbb{V}_K}^{(|\mathbb{V}_x|)} = M_{\mathbb{L}_1} N_{\mathbb{L}_1} + M_{\mathbb{L}_1}, q_{\mathbb{V}_y}^{(1)} = -M_{\mathbb{L}_2} N_{\mathbb{L}_2} - M_{\mathbb{L}_2} + 2,$$

$$q_{\mathbb{V}_y}^{(|\mathbb{V}_y|)} = M_{\mathbb{L}_2} N_{\mathbb{L}_2} + M_{\mathbb{L}_2}, \text{ and } |\mathbb{V}_x| = 2(M_{\mathbb{L}_1} N_{\mathbb{L}_1} + M_{\mathbb{L}_1}) - 1,$$

$$|\mathbb{V}_y| = 2(M_{\mathbb{L}_2} N_{\mathbb{L}_2} + M_{\mathbb{L}_2}) - 1;$$

elements corresponding to the positions of all virtual array elements in the virtual uniform cross array $\mathbb{V}$ are extracted from the virtual domain signal $\hat{\mathcal{V}}_\mathbb{W}$ of the non-contiguous virtual cross array $\mathbb{W}$ to obtain the fourth-order virtual domain signal $\hat{\mathcal{U}}_\mathbb{V} \in \mathbb{C}^{|\mathbb{V}_x| \times |\mathbb{V}_y|}$ corresponding to $\mathbb{V}$;

(6) respectively extracting sub-arrays $$\mathbb{Q}_x^{(1)} = \{(x_\mathbb{Q}^{(1)}, 0) | x_\mathbb{Q}^{(1)} = [1, 2, \ldots, q_{\mathbb{Q}_x}^{(|\mathbb{Q}_x|)}]d\},$$

$$\mathbb{Q}_y^{(1)} = \{(0, y_\mathbb{Q}^{(1)}) | y_\mathbb{Q}^{(1)} = [1, 2, \ldots, q_{\mathbb{Q}_y}^{(|\mathbb{Q}_y|)}]d\}$$

from $\mathbb{V}_x$ and $\mathbb{V}_y$ as translation windows; then, respectively translating the translation windows $$\mathbb{Q}_x^{(1)} \text{ and } \mathbb{Q}_y^{(1)}$$

along a negative semi-axis direction of the axis x and the axis y by a virtual array element interval d, to obtain $J_x$ virtual uniform linear sub-arrays $$\mathbb{Q}_x^{(j_x)} = \{(x_\mathbb{Q}^{(j_x)}, 0) | x_\mathbb{Q}^{(j_x)} = [2-j_x, 3-j_x, \ldots, q_{\mathbb{Q}_x}^{(|\mathbb{Q}_x|)} + 1 - j_x]d\}$$

and $J_y$ virtual uniform linear sub-arrays $$\mathbb{Q}_y^{(j_y)} = \{(0, y_\mathbb{Q}^{(j_y)}) | y_\mathbb{Q}^{(j_y)} = [2-j_y, 3-j_y, \ldots, q_{\mathbb{Q}_y}^{(|\mathbb{Q}_y|)} + 1 - j_y]d\},$$

$j_x=1, 2, \ldots, J_x$, $j_y=1, 2, \ldots, J_y$, $J_x=(|\mathbb{V}_x|+1)/2$, $J_y=(|\mathbb{V}_y|+1)/2$, so that the virtual domain signal corresponding to the virtual uniform sub-array $$\tilde{\mathbb{Q}}_{(j_x,j_y)} = \mathbb{Q}_x^{(j_x)} \cup \mathbb{Q}_y^{(j_y)}$$

can be expressed as $$U_{\tilde{\mathbb{Q}}_{(j_x,j_y)}}$$

$\in \mathbb{C}^{J_x \times J_y}$; fixing $j_y$ index, superimposing $$U_{\tilde{\mathbb{Q}}_{(:,j_y)}}$$

in a third dimension to obtain $J_y$ three-dimensional virtual domain tensors, and then, superimposing the $J_y$ three-dimensional virtual domain tensors in a fourth dimension to obtain a four-dimensional denoised structured virtual domain tensor $\tilde{\mathcal{U}} \in \mathbb{C}^{J_x \times J_y \times J_x \times J_y}$, which is expressed as follows:

$$\tilde{\mathcal{U}} = \sum_{k=1}^{K} \left(\frac{1}{T} s_k^T s_k^*\right) l_x(k) \cdot l_y(k) \cdot v_x(k) \cdot v_y(k),$$

wherein:

$$l_x(k) = \left[e^{-j\pi\mu_1(k)}, e^{-j\pi 2\mu_1(k)}, \ldots, e^{-j\pi q_{\mathbb{Q}_x}^{(|\mathbb{Q}_x|)}\mu_1(k)}\right]^T,$$

$$l_y(k) = \left[e^{-j\pi\mu_2(k)}, e^{-j\pi 2\mu_2(k)}, \ldots, e^{-j\pi q_{\mathbb{Q}_y}^{(|\mathbb{Q}_y|)}\mu_2(k)}\right]^T,$$

are steering vectors of $$\mathbb{Q}_x^{(1)} \text{ and } \mathbb{Q}_y^{(1)},$$

respectively, $$v_x(k) = \left[1, e^{-j\pi\mu_1(k)}, \ldots, e^{-j\pi(q_{\mathbb{Q}_x}^{(|\mathbb{Q}_x|)}-1)\mu_1(k)}\right]^T,$$

$$v_y(k) = \left[1, e^{-j\pi\mu_2(k)}, \ldots, e^{-j\pi(q_{\mathbb{Q}_y}^{(|\mathbb{Q}_y|)}-1)\mu_2(k)}\right]^T,$$

are translation factors along the x axis and the y axis, respectively;

(7) performing tensor decomposition on the denoised structured virtual domain tensor $\tilde{\mathcal{U}}$ by canonical polyadic decomposition (CPD) to obtain an estimated value of each spatial factor of $\tilde{\mathcal{U}}$, that is, $\{\hat{l}_x(k), \hat{l}_y(k), \hat{v}_x(k), \hat{v}_y(k)\}$;

extracting parameters $\hat{\mu}_1(k)$ and $\hat{\mu}_2(k)$ from $\{\hat{l}_x(k), \hat{l}_y(k), \hat{v}_x(k), \hat{v}_y(k)\}$, and obtaining a closed-form solution of the two-dimensional direction of arrival estimation $(\hat{\theta}_k, \hat{\varphi}_k)$ according to a relationship between $\{\mu_1(k), \mu_2(k)\}$ and the two-dimensional direction of arrival $(\theta_k, \varphi_k)$.

Further, the structure of the linear sub-array partition type L-shaped coprime array in step (1) is specifically described as follows: the coprime linear array $\mathbb{L}_i$ forming the L-shaped coprime array is composed of a pair of sparse uniform linear sub-arrays, two sparse uniform linear sub-arrays respectively contain $2M_{\mathbb{L}_i}$ and $N_{\mathbb{L}_i}$ antenna array elements, and array element spacings are respectively $N_{\mathbb{L}_i}d$ and $M_{\mathbb{L}_i}d$; the two sparse linear uniform sub-arrays in $\mathbb{L}_i$ are combined in a form of overlapping the first array elements to obtain a coprime linear array $\mathbb{L}_i$ containing $|\mathbb{L}_i|=2M_{\mathbb{L}_i}+N_{\mathbb{L}_i}-1$ array elements.

Further, for the fourth-order sampling noise tensor $\mathcal{Z}$ described in step (3), the $(\tau, \varsigma)$th elements in $$\frac{1}{T}\sum_{k=1}^{K}a_{\mathbb{L}_1}(k)\cdot(s_k^T N_{\mathbb{L}_2}^H), \frac{1}{T}\sum_{k=1}^{K}a_{\mathbb{L}_2}(k)\cdot(s_k^T N_{\mathbb{L}_1}^H) \text{ and } \frac{1}{T}N_{\mathbb{L}_1}N_{\mathbb{L}_2}^H$$

are expressed as $g_{(\tau,\varsigma)}$, $h_{(\tau,\varsigma)}$ and $n_{(\tau,\varsigma)}$, $\tau=1, 2, \ldots, |\mathbb{L}_1|$, $\varsigma=1, 2, \ldots, |\mathbb{L}_2|$ respectively, then the $(\tau_1, \varsigma_1, \tau_2, \varsigma_2)$th element in $\mathcal{Z}$ is expressed as follows:

$$\mathcal{Z}_{(\tau_1,\varsigma_1,\tau_2,\varsigma_2)} = \left(g_{(\tau_1,\varsigma_1)} + h_{(\tau_1,\varsigma_1)} + n_{(\tau_1,\varsigma_1)}\right)\left(g_{(\tau_2,\varsigma_2)} + h_{(\tau_2,\varsigma_2)} + n_{(\tau_2,\varsigma_2)}\right)^*$$

$$= g_{(\tau_1,\varsigma_1)}g^*_{(\tau_2,\varsigma_2)} + g_{(\tau_1,\varsigma_1)}h^*_{(\tau_2,\varsigma_2)} + g_{(\tau_1,\varsigma_1)}n^*_{(\tau_2,\varsigma_2)} + h_{(\tau_1,\varsigma_1)}g^*_{(\tau_2,\varsigma_2)} +$$
$$h_{(\tau_1,\varsigma_1)}h^*_{(\tau_2,\varsigma_2)} + h_{(\tau_1,\varsigma_1)}n^*_{(\tau_2,\varsigma_2)} + n_{(\tau_1,\varsigma_1)}g^*_{(\tau_2,\varsigma_2)} + n_{(\tau_1,\varsigma_1)}h^*_{(\tau_2,\varsigma_2)} +$$
$$n_{(\tau_1,\varsigma_1)}n^*_{(\tau_2,\varsigma_2)};$$

$g_{(\tau,\varsigma)}$, $h_{(\tau,\varsigma)}$ and $n_{(\tau,\varsigma)}$ respectively obey the approximate complex Gaussian distribution, that is:

$$g_{(\tau,\varsigma)} \sim AsC\mathcal{N}\left(0, \frac{1}{T}\sigma_n^2\sum_{k=1}^{K}\sigma_k^2\right),$$

$$h_{(\tau,\varsigma)} \sim AsC\mathcal{N}\left(0, \frac{1}{T}\sigma_n^2\sum_{k=1}^{K}\sigma_k^2\right),$$

$$n_{(\tau,\varsigma)} \sim AsC\mathcal{N}\left(0, \frac{1}{T}\sigma_n^4\right),$$

so $$g_{(\tau_1,\varsigma_1)}g^*_{(\tau_2,\varsigma_2)}, g_{(\tau_1,\varsigma_1)}h^*_{(\tau_2,\varsigma_2)}, h_{(\tau_1,\varsigma_1)}g^*_{(\tau_2,\varsigma_2)}, h_{(\tau_1,\varsigma_1)}h^*_{(\tau_2,\varsigma_2)} \sim AsC\mathcal{N}\left(0, \frac{1}{2}\left(\sigma_n^2\sum_{k=1}^{K}\sigma_k^2\right)^2\right),$$

$$g_{(\tau_1,\varsigma_1)}n^*_{(\tau_2,\varsigma_2)}, h_{(\tau_1,\varsigma_1)}n^*_{(\tau_2,\varsigma_2)}, n_{(\tau_1,\varsigma_1)}g^*_{(\tau_2,\varsigma_2)}, n_{(\tau_1\varsigma_1)}h^*_{(\tau_2,\varsigma_2)} \sim AsC\mathcal{N}\left(0, \frac{1}{T^2}\sigma_n^6\sum_{k=1}^{K}\sigma_k^2\right),$$

$$n_{(\tau_1\varsigma_1)}n^*_{(\tau_2,\varsigma_2)} \sim AsC\mathcal{N}\left(0, \frac{1}{T^2}\sigma_n^8\right).$$

$\mathcal{Z}_{(\tau_1,\varsigma_1,\tau_2,\varsigma_2)}$ also obeys the approximate complex Gaussian distribution, and an approximate variance thereof $\bar{\sigma}^2$ is expressed as follows:

$$\bar{\sigma}^2 = \frac{1}{T^2}\left[\lambda_1\left(\sigma_n^2\sum_{k=1}^{K}\sigma_k^2\right)^2 + \lambda_2\sigma_n^6\sum_{k=1}^{K}\sigma_k^2 + \lambda_3\sigma_n^8\right].$$

Further, for the fourth-order virtual domain signal derivation described in step (5), the virtual domain signal $\hat{U}_\mathbb{V} \in \mathbb{C}^{|\mathbb{V}_x|\times|\mathbb{V}_y|}$ corresponding to the virtual uniform cross array $\mathbb{V}$ can be expressed as follows:

$$\hat{U}_\mathbb{V} = \sum_{k=1}^{K}\left(\frac{1}{T}s_k^T s_k^*\right)g_x(k)\circ g_y(k),$$

-continued wherein:

$$g_x(k) = \left[e^{-j\pi q_{\mathbb{V}_x}^{(1)}\mu_1(k)}, e^{-j\pi q_{\mathbb{V}_x}^{(2)}\mu_1(k)}, \ldots, e^{-j\pi q_{\mathbb{V}_x}^{(|\mathbb{V}_x|)}\mu_1(k)}\right]^T,$$

$$g_y(k) = \left[e^{-j\pi q_{\mathbb{V}_y}^{(1)}\mu_2(k)}, e^{-j\pi q_{\mathbb{V}_y}^{(2)}\mu_2(k)}, \ldots, e^{-j\pi q_{\mathbb{V}_y}^{(|\mathbb{V}_y|)}\mu_2(k)}\right]^T,$$

are steering vectors of $\mathbb{V}_x$ and $\mathbb{V}_y$, respectively,

Further, for the two-dimensional direction of arrival estimation process described in step (7), parameters $\hat{\mu}_1(k)$ and $\hat{\mu}_2(k)$ are extracted from $\{\hat{l}_x(k), \hat{l}_y(k), \hat{v}_x(k), \hat{v}_y(k)\}$:

$$\hat{\mu}_1(k) = \angle\left(\hat{l}_x^T(k)\hat{v}_x(k)/J_x\right)/\pi,$$

$$\hat{\mu}_2(k) = \angle\left(\hat{l}_y^T(k)\hat{v}_y(k)/J_y\right)/\pi,$$

wherein, $\angle(\cdot)$ represents an operation of taking the argument of a complex number; the closed-form solution of the two-dimensional direction of arrival estimation $(\hat{\theta}_k, \hat{\varphi}_k)$ is obtained according to the relationship between $\{\mu_1(k), \mu_2(k)\}$ and the two-dimensional direction of arrival $(\theta_k, \varphi_k)$, that is, $\mu_1(k)=\sin(\varphi_k)\cos(\theta_k)$ and $\mu_2(k)=\sin(\mu_k)\sin(\theta_k)$:

$$\hat{\theta}_k = \arctan\left(\frac{\hat{\mu}_2(k)}{\hat{\mu}_1(k)}\right),$$

$$\hat{\varphi}_k = \sqrt{\hat{\mu}_1(k)^2 + \hat{\mu}_2(k)^2}.$$

Further, in step (7), according to a uniqueness condition of the CPD, the following condition must be met for performing CPD on $\tilde{\mathcal{U}}$:

$$\kappa(\hat{L}_x) + \kappa(\hat{L}_y) + \kappa(\hat{V}_x) + \kappa(\hat{V}_y) \geq 2K+3,$$

wherein, $\kappa(\cdot)$ represents a Kruskal rank of the matrix, $\hat{L}_x=[\hat{l}_x(1), \hat{l}_x(2), \ldots \hat{l}_x(K)] \in \mathbb{C}^{J_x \times K}$, $\hat{L}_y=[\hat{l}_y(1), \hat{l}_y(2), \ldots \hat{l}_y(K)] \in \mathbb{C}^{J_y \times K}$, $\hat{V}_x=[\hat{v}_x(1), \hat{v}_x(2), \ldots \hat{v}_x(K)] \in \mathbb{C}^{J_x \times K}$ and $\hat{V}_y=[\hat{v}_y(1), \hat{v}_y(2), \ldots \hat{v}_y(K)] \in \mathbb{C}^{J_y \times K}$ are the factor matrices of $\tilde{\mathcal{U}}$; $\kappa(\hat{L}_x)=\min(J_x, K)$, $\kappa(\hat{L}_y)=\min(J_y, K)$, $\kappa(\hat{V}_x)=\min(J_x, K)$ and $\kappa(\hat{V}_y)=\min(J_y, K)$ are substituted into the uniqueness conditional inequality of the CPD to obtain $K \leq \lfloor(|\mathbb{V}_x|+|\mathbb{V}_y|-1)/2\rfloor$, where $\lfloor\cdot\rfloor$ represents a round-up operation; therefore, the maximum target number of the direction of arrival estimation that can be achieved in the proposed method of the present invention is $\lfloor(|\mathbb{V}_x|+|\mathbb{V}_y|-1)/2\rfloor$.

Compared with the prior art, the present invention has the following advantages:

(1) The present invention obtains the second-order signal statistic which removes noise power interference by performing cross-correlation calculation on the received signal of the sub-array partition L-shaped coprime array, and further expands the fourth-order covariance tensor, and implements the virtual domain tensor derivation;

(2) The present invention designs the fourth-order sampling covariance tensor denoising method based on kernel tensor threshold filtering according to the statistical characteristic analysis of the coprime array fourth-order sampling covariance tensor. It provides a foundation of suppressing the interference of sampling noise and constructing the denoised virtual domain tensor; and (3) The present invention proposes the structured superposition mechanism for the denoised virtual domain signals, and performs the tensor decomposition and angle information extraction on the constructed denoised structured virtual domain tensors, so as to realize accurate two-dimensional direction of arrival estimation under the underdetermined condition.

DESCRIPTION OF THE EMBODIMENTS

The technical solutions of the present invention will be described in further detail below with reference to the accompanying drawings.

Figure 1:
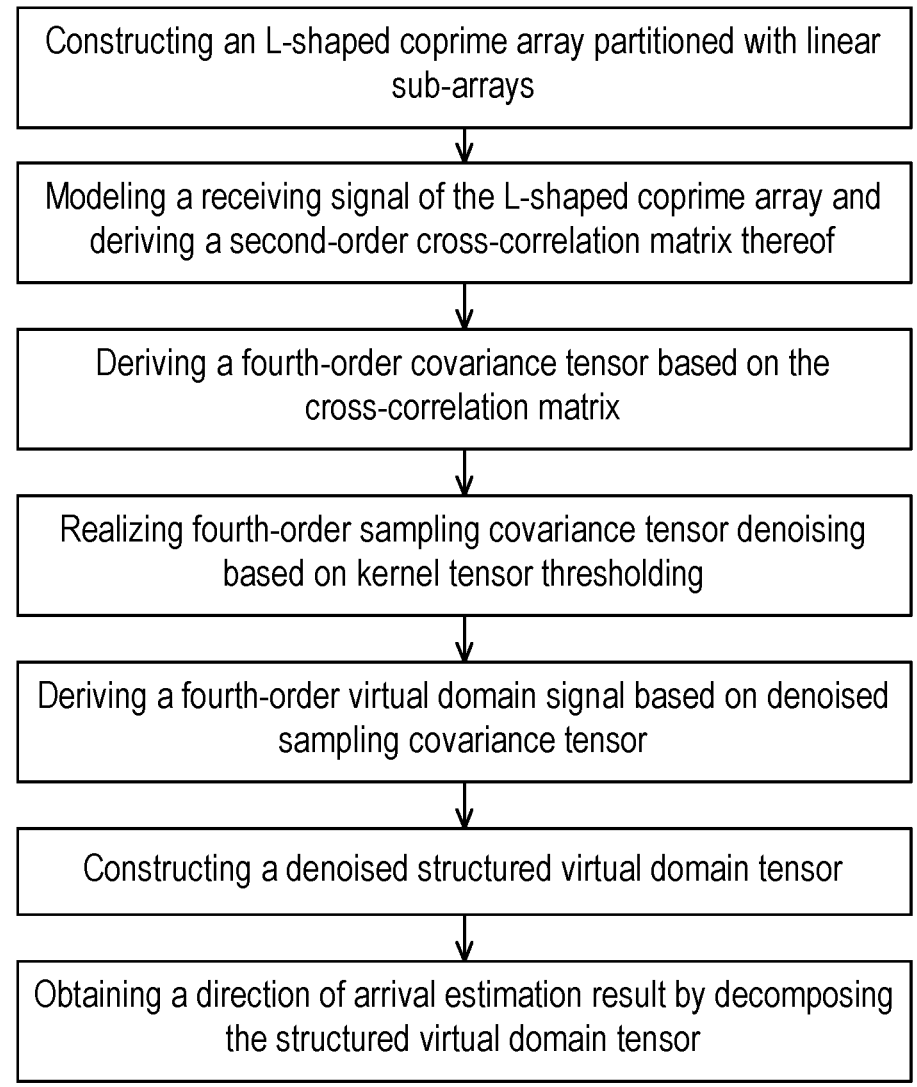
FIG. 1 is a general flow block diagram of the present invention.
Figure 2:
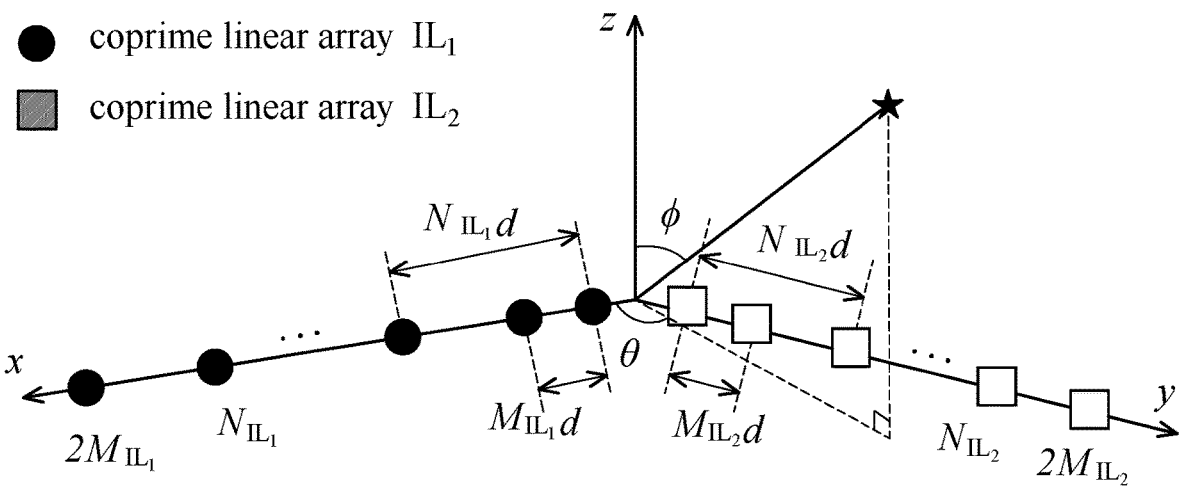
FIG. 2 is a schematic structural diagram of a sub-array partition L-type coprime array proposed by the present invention.

In order to solve the problems of a damage to a signal structure and noise term interference to high-order virtual domain statistics in an existing method, the present invention proposes a method for estimating a direction of arrival of a sub-array partition type L-shaped coprime array based on fourth-order sampling covariance tensor denoising, wherein high-order tensor statistics of the sub-array partition L-shaped coprime array is derived, a denoising technique for the sampling covariance tensor is designed, and a high-precision two-dimensional direction of arrival estimation is realized based on denoised virtual domain tensor signal processing. Refer to FIG. 1, the implementation steps of the present invention are as follows:

Step 1: constructing a linear sub-array partition type L-shaped coprime array. At a receiving end, using $2M_{\mathbb{L}_1} + N_{\mathbb{L}_1} + 2M_{\mathbb{L}_2} + N_{\mathbb{L}_2} - 2$ physical antenna array elements to construct a linear sub-array partition L-shaped coprime array, as shown in FIG. 2: constructing a coprime linear array $\mathbb{L}_i$, $i=1, 2$ on the x axis and y axis respectively, where $\mathbb{L}_i$ contains $|\mathbb{L}_i|=2M_{\mathbb{L}_i}+N_{\mathbb{L}_i}-1$ antenna array elements, wherein, $M_{\mathbb{L}_1}$ and $N_{\mathbb{L}_1}$ are a pair of coprime integers, $|\cdot|$ represents a potential of the set; the first array elements of the two coprime linear arrays $\mathbb{L}_1$ and $\mathbb{L}_2$ are laid out from the positions where the coordinates are 1 on the x axis and y axis respectively, so the two coprime linear arrays $\mathbb{L}_1$ and $\mathbb{L}_2$ that make up the L-shaped coprime array do not overlap with each other; respectively using $$\{(x_{\mathbb{L}_1}, 0) | x_{\mathbb{L}_1} = [c_{\mathbb{L}_1}^{(1)}, c_{\mathbb{L}_1}^{(2)}, \ldots, c_{\mathbb{L}_1}^{(|\mathbb{L}_1|)}]d\}$$

and $$\{(0, y_{\mathbb{L}_2}) | y_{\mathbb{L}_2} = [c_{\mathbb{L}_2}^{(1)}, c_{\mathbb{L}_2}^{(2)}, \ldots, c_{\mathbb{L}_2}^{(|\mathbb{L}_2|)}]d\}$$

to represent the positions of all array element of the L-shaped coprime array on the x axis and y axis, where, $$c_{\mathbb{L}_1}^{(1)} = c_{\mathbb{L}_2}^{(1)} = 1,$$

and the unit interval d is taken as half of the wavelength of an incident narrowband signal; the two partition coprime linear arrays $\mathbb{L}_i$ constituting the L-shaped coprime array are respectively composed of a pair of sparse uniform linear sub-arrays, and the two sparse uniform linear sub-arrays respectively contain $2M_{\mathbb{L}_1}$ and $N_{\mathbb{L}_1}$ antenna array elements, $M_{\mathbb{L}_1} < N_{\mathbb{L}_1}$, and the array element spacings are respectively $N_{\mathbb{L}_1}d$ and $M_{\mathbb{L}_1}d$, and they are combined in a form of overlapping the first array elements to obtain a coprime linear array $\mathbb{L}_i$ containing $2M_{\mathbb{L}_1}+N_{\mathbb{L}_1}-1$ array elements.

Step 2: modeling a received signal of the L-shaped coprime array and deriving a second-order cross-correlation matrix thereof. assuming that there are K far-field narrowband incoherent signal sources from $\{(\theta_1, \varphi_1), (\theta_2, \varphi_2), \ldots, (\theta_K, \varphi_K)\}$ directions, a received signal of the two coprime linear arrays $\mathbb{L}_1$ and $\mathbb{L}_2$ forming the L-shaped coprime array is modeled as follows:

$$X_{\mathbb{L}_i} = \sum_{k=1}^{K} a_{\mathbb{L}_i}(k) \circ s_k + N_{\mathbb{L}_i} \in \mathbb{C}^{|\mathbb{L}_i| \times T},$$

wherein, $s_k = [s_{k,1}, s_{k,2}, \ldots, s_{k,T}]^T$ is a multi-snapshot sampling signal waveform corresponding to a kth incident signal source, T is the number of sampling snapshots, $\circ$ represents the outer product of the vector, $N_{\mathbb{L}_1}$ is noise independent of each signal source, $a_{\mathbb{L}_i}(k)$ is a steering vector of $\mathbb{L}_i$, and corresponds to a signal source having an incoming wave direction of $(\theta_k, \varphi_k)$ and is expressed as follows:

$$a_{\mathbb{L}_i}(k) = \left[ e^{-j\pi \mathbb{L}_i^{(1)} \mu_i(k)}, e^{-j\pi \mathbb{L}_i^{(2)} \mu_i(k)}, \ldots, e^{-j\pi \mathbb{L}_i^{(|\mathbb{L}_i|)} \mu_i(k)} \right]^T,$$

wherein, $\mu_1(k) = \sin(\mu_k)\cos(\theta_k)$, $\mu_2(k) = \sin(\mu_k)\sin(\theta_k)$, $j = \sqrt{-1}$, $[\bullet]^T$ represents a transpose operation; a second-order cross-correlation matrix $R_{\mathbb{L}_1 \mathbb{L}_2} \in \mathbb{C}^{|\mathbb{L}_1| \times |\mathbb{L}_2|}$ is obtained by solving cross-correlation statistics of sampling signals $X_{\mathbb{L}_1}$ and $X_{\mathbb{L}_2}$ of coprime linear arrays $\mathbb{L}_1$ and $\mathbb{L}_2$:

$$R_{\mathbb{L}_1 \mathbb{L}_2} = E\{X_{\mathbb{L}_1} X_{\mathbb{L}_2}^H\} = \sum_{k=1}^{K} \sigma_k^2 a_{\mathbb{L}_1}(k) \circ a_{\mathbb{L}_2}^*(k),$$

wherein, $$\sigma_k^2 = E\{s_k(t) s_k^*(t)\}$$

represents power of a kth incident signal source, $E\{\bullet\}$ represents a mathematical expectation operation, $(\bullet)^H$ represents a conjugate transpose operation, $(\bullet)^*$ represents a conjugate operation; by performing the cross-correlation calculation on the received signals, the noise power term introduced by the autocorrelation calculation of the noise $N_{\mathbb{L}_1}$ is eliminated, that is, $$E\{N_{\mathbb{L}_i} N_{\mathbb{L}_i}^H\} = \sigma_n^2 I,$$

where $$\sigma_n^2$$

represents the noise power and I represents the identity matrix.

Step 3: deriving a fourth-order covariance tensor based on the cross-correlation matrix. In order to realize the derivation of an augmented virtual array, based on the second-order cross-correlation statistics, fourth-order statistics of L-type coprime arrays are further derived. Specifically, calculating the autocorrelation of the second-order cross-correlation matrix $R_{\mathbb{L}_1 \mathbb{L}_2}$ to obtain a fourth-order covariance tensor $\mathcal{V} \in \mathbb{C}^{|\mathbb{L}_1| \times |\mathbb{L}_2| \times |\mathbb{L}_1| \times |\mathbb{L}_2|}$:

$$\mathcal{V} = R_{\mathbb{L}_1 \mathbb{L}_2} \circ R_{\mathbb{L}_1 \mathbb{L}_2}^* = E\{(X_{\mathbb{L}_1} X_{\mathbb{L}_2}^H) \circ (X_{\mathbb{L}_1} X_{\mathbb{L}_2}^H)^*\}$$

$$= \sum_{k=1}^{K} \sigma_k^4 a_{\mathbb{L}_1}(k) \circ a_{\mathbb{L}_2}^*(k) \circ a_{\mathbb{L}_1}^*(k) \circ a_{\mathbb{L}_2}(k).$$

In practice, it can be obtained by estimating the fourth-order statistic of the received signals $X_{\mathbb{L}_1}$ and $X_{\mathbb{L}_2}$, that is, the fourth-order sampling covariance tensor $\hat{\mathcal{V}} \in \mathbb{C}^{|\mathbb{L}_1| \times |\mathbb{L}_2| \times |\mathbb{L}_1| \times |\mathbb{L}_2|}$:

$$\hat{\mathcal{V}} = \left(\frac{1}{T} X_{\mathbb{L}_1} X_{\mathbb{L}_2}^H\right) \circ \left(\frac{1}{T} X_{\mathbb{L}_1} X_{\mathbb{L}_2}^H\right)^* =$$

$$\sum_{k=1}^{K} \left(\frac{1}{T} s_k^T s_k^*\right) a_{\mathbb{L}_1}(k) \circ a_{\mathbb{L}_2}^*(k) \circ a_{\mathbb{L}_1}^*(k) \circ a_{\mathbb{L}_2}(k) + \mathcal{Z},$$

wherein:

$$\mathcal{Z} = \left[\frac{1}{T}\sum_{k=1}^{K} a_{\mathbb{L}_1}(k) \circ (s_k^T N_{\mathbb{L}_2}^H) + \frac{1}{T}\sum_{k=1}^{K} a_{\mathbb{L}_2}(k) \circ (s_k^T N_{\mathbb{L}_1}^H) + \frac{1}{T} N_{\mathbb{L}_1} N_{\mathbb{L}_2}^H\right]$$

$$\left[\frac{1}{T}\sum_{k=1}^{K} a_{\mathbb{L}_1}(k) \circ (s_k^T N_{\mathbb{L}_2}^H) + \frac{1}{T}\sum_{k=1}^{K} a_{\mathbb{L}_2}(k) \circ (s_k^T N_{\mathbb{L}_1}^H) + \frac{1}{T} N_{\mathbb{L}_1} N_{\mathbb{L}_2}^H\right]^*$$

is the fourth-order sampling noise tensor. The $(\tau, \varsigma)$th elements in $$\frac{1}{T}\sum_{k=1}^{K} a_{\mathbb{L}_1}(k) \circ (s_k^T N_{\mathbb{L}_2}^H) \frac{1}{T}\sum_{k=1}^{K} a_{\mathbb{L}_2}(k) \circ (s_k^T N_{\mathbb{L}_1}^H) \text{ and } \frac{1}{T} N_{\mathbb{L}_1} N_{\mathbb{L}_2}^H$$

are expressed as $g_{(\tau, \varsigma)}$, $h_{(\tau, \varsigma)}$ and $n(\tau, \varsigma)$, $\tau = 1, 2, \ldots, |\mathbb{L}_1|$, $\varsigma = 1, 2, \ldots, |\mathbb{L}_2|$ respectively, then the $(\tau_1, \varsigma_1, \tau_2, \varsigma_2)$th element in $\mathcal{Z}$ may be expressed as follows:

$$\mathcal{Z}_{(\tau_1, \varsigma_1, \tau_2, \varsigma_2)} =$$

$$(g_{(\tau_1,\varsigma_1)} + h_{(\tau_1,\varsigma_1)} + n_{(\tau_1,\varsigma_1)})(g_{(\tau_2,\varsigma_2)} + h_{(\tau_2,\varsigma_2)} + n_{(\tau_2,\varsigma_2)})^* = g_{(\tau_1,\varsigma_1)} g_{(\tau_2,\varsigma_2)}^* +$$

$$g_{(\tau_1,\varsigma_1)} h_{(\tau_2,\varsigma_2)}^* + g_{(\tau_1,\varsigma_1)} n_{(\tau_2,\varsigma_2)}^* + h_{(\tau_1,\varsigma_1)} g_{(\tau_2,\varsigma_2)}^* + h_{(\tau_1,\varsigma_1)} h_{(\tau_2,\varsigma_2)}^* +$$

$$h_{(\tau_1,\varsigma_1)} n_{(\tau_2,\varsigma_2)}^* + n_{(\tau_1,\varsigma_1)} g_{(\tau_2,\varsigma_2)}^* + n_{(\tau_1,\varsigma_1)} h_{(\tau_2,\varsigma_2)}^* + n_{(\tau_1,\varsigma_1)} n_{(\tau_2,\varsigma_2)}^*,$$

wherein, $\tau_1, \tau_2 = 1, 2, \ldots, |\mathbb{L}_1|$, $\varsigma_1, \varsigma_2 = 1, 2, \ldots, |\mathbb{L}_2|$, $g_{(\tau, \varsigma)}$, $h_{(\tau, \varsigma)}$ and $n(\tau, \varsigma)$ respectively obey the approximate complex Gaussian distribution, that is:

$$g_{(\tau,\varsigma)} \sim AsCN\left(0, \frac{1}{T}\sigma_n^2\sum_{k=1}^{K}\sigma_k^2\right),$$

$$h_{(\tau,\varsigma)} \sim AsCN\left(0, \frac{1}{T}\sigma_n^2\sum_{k=1}^{K}\sigma_k^2\right),$$

$$n_{(\tau,\varsigma)} \sim AsCN\left(0, \frac{1}{T}\sigma_n^4\right),$$

so $$g_{(\tau_1,\varsigma_1)}g^*_{(\tau_2,\varsigma_2)}, g_{(\tau_1,\varsigma_1)}h^*_{(\tau_2,\varsigma_2)}, h_{(\tau_1\varsigma_1)}g^*_{(\tau_2,\varsigma_2)}, h_{(\tau_1,\varsigma_1)}h^*_{(\tau_2,\varsigma_2)} \sim AsCN\left(0, \frac{1}{T^2}\sigma_n^2\sum_{k=1}^{K}\sigma_k^2\right),$$

$$g_{(\tau_1,\varsigma_1)}n^*_{(\tau_2,\varsigma_2)}, h_{(\tau_1,\varsigma_1)}n^*_{(\tau_2,\varsigma_2)}, n_{(\tau_1\varsigma_1)}g^*_{(\tau_2,\varsigma_2)}, n_{(\tau_1,\varsigma_1)}h^*_{(\tau_2,\varsigma_2)} \sim AsCN\left(0, \frac{1}{T^2}\sigma_n^6\sum_{k=1}^{K}\sigma_k^2\right),$$

$$n_{(\tau_1,\varsigma_1)}n^*_{(\tau_2,\varsigma_2)} \sim AsCN\left(0, \frac{1}{T^2}\sigma_n^8\right),$$

$\mathcal{Z}_{(\tau_1,\varsigma_1,\tau_2,\varsigma_2)}$ also obeys the approximate complex Gaussian distribution, and an approximate variance thereof $\bar{\sigma}^2$ is expressed as follows:

$$\bar{\sigma}^2 = \frac{1}{T^2}\left[\lambda_1\left(\sigma_n^2\sum_{k=1}^{K}\sigma_k^2\right)^2 + \lambda_2\sigma_n^6\sum_{k=1}^{K}\sigma_k^2 + \lambda_3\sigma_n^8\right],$$

wherein, $\lambda_1$, $\lambda_2$ and $\lambda_3$ represent a combined weight of three sub-variance terms $$\left(\sigma_n^2\sum_{k=1}^{K}\sigma_k^2\right)^2, \sigma_n^6\sum_{k=1}^{K}\sigma_k^2 \text{ and } \sigma_n^8.$$

Step 4: implementing fourth-order sampling covariance tensor denoising based on kernel tensor thresholding. Performing high-order singular value decomposition on the fourth-order sampling covariance tensor $\hat{\mathcal{V}}$:

$$\hat{\mathcal{V}} = \mathcal{S} \times_1 Y^{(1)} \times_2 Y^{(2)} \times_3 Y^{(3)} \times_4 Y^{(4)},$$

wherein, $\mathcal{S} \in \mathbb{C}^{|\mathbb{L}_1|\times|\mathbb{L}_2|\times|\mathbb{L}_1|\times|\mathbb{L}_2|}$ represents a kernel tensor, which contains projections from signal and noise components in $\hat{\mathcal{V}}$, $Y^{(1)} \in \mathbb{C}^{|\mathbb{L}_1|\times|\mathbb{L}_1|}$, $Y^{(2)} \in \mathbb{C}^{|\mathbb{L}_2|\times|\mathbb{L}_2|}$, $Y^{(3)} \in \mathbb{C}^{|\mathbb{L}_1|\times|\mathbb{L}_1|}$ and $Y^{(4)} \in \mathbb{C}^{|\mathbb{L}_2|\times|\mathbb{L}_2|}$ represent singular matrices corresponding to four dimensions of $\hat{\mathcal{V}}$; the thresholding is performed on $\mathcal{S}$, that is, elements in $\mathcal{S}$ that are less than or equal to a noise threshold $\epsilon$ are set to zero, and elements larger than the noise threshold $\epsilon$ are reserved, thus obtaining a thresholded kernel tensor $\mathcal{S}_{dn}$, where an element in $\mathcal{S}_{dn}$ is expressed as follows:

$$\mathcal{S}_{dn(\tau_1,\varsigma_1,\tau_2,\varsigma_2)} = \begin{cases} \mathcal{S}_{(\tau_1,\varsigma_1,\tau_2,\varsigma_2)} & |\mathcal{S}_{(\tau_1,\varsigma_1,\tau_2,\varsigma_2)}| > \epsilon, \\ 0 & |\mathcal{S}_{(\tau_1,\varsigma_1,\tau_2,\varsigma_2)}| \leq \epsilon, \end{cases}$$

and wherein, $\mathcal{S}_{(\tau_1,\varsigma_1,\tau_2,\varsigma_2)}$ represents a $(\tau_1, \varsigma_1, \tau_2, \varsigma_2)$th element of $\mathcal{S}$, the noise threshold $\epsilon$ is as follows:

$$\epsilon = \bar{\sigma}^2\sqrt{2\log(|\mathbb{L}_1||\mathbb{L}_2||\mathbb{L}_1||\mathbb{L}_2|)}.$$

Further, the thresholded kernel tensor $\mathcal{S}_{dn}$ is multiplied with the four singular matrices $Y^{(1)}$, $Y^{(2)}$, $Y^{(3)}$ and $Y^{(4)}$ to obtain a denoised sampling covariance tensor $\hat{\mathcal{V}}_{dn}$, which is expressed as follows:

$$\hat{\mathcal{V}}_{dn} = \mathcal{S}_{dn} \times_1 Y^{(1)} \times_2 Y^{(2)} \times_3 Y^{(3)} \times_4 Y^{(4)}.$$

Figure 3:
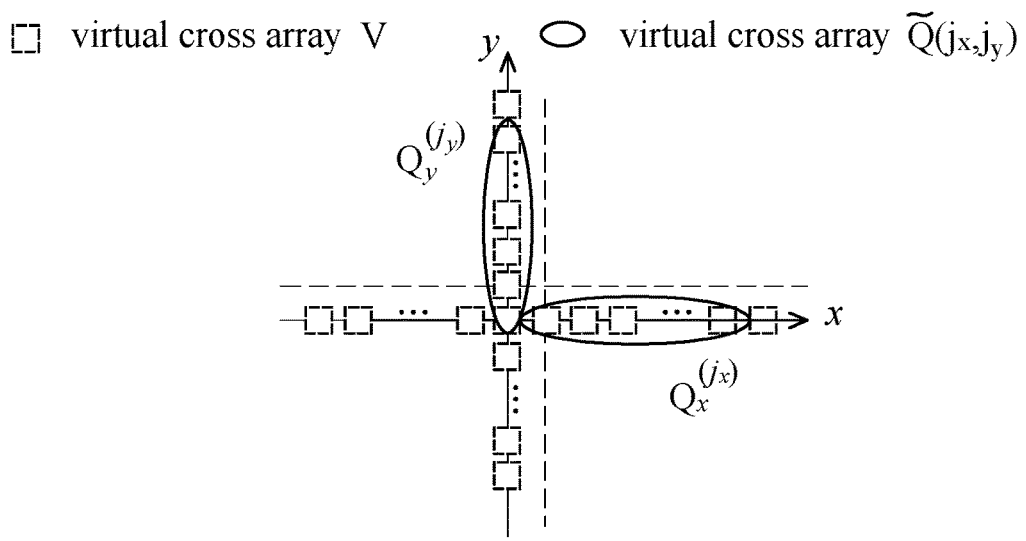
FIG. 3 is a schematic diagram of virtual uniform cross arrays and virtual uniform sub-arrays thereof constructed by the present invention.

Step 5: deriving a fourth-order virtual domain signal based on the denoised sampling covariance tensor. By merging dimensions representing spatial information in the same direction in the denoised sampling covariance tensor $\hat{\mathcal{V}}_{dn}$, the conjugate steering vectors $$\{a_{\mathbb{L}_1}(k), a^*_{\mathbb{L}_1}(k)\} \text{ and } \{a_{\mathbb{L}_2}(k), a^*_{\mathbb{L}_2}(k)\}$$

corresponding to the two coprime linear arrays $\mathbb{L}_1$ and $\mathbb{L}_2$ can form a difference set array on the exponential term, so that augmented virtual linear arrays are respectively constructed on the x axis and the y axis, corresponding to a two-dimensional non-continuous virtual cross array $\mathbb{W}$. Specifically, the first and third dimensions of the denoised sampling covariance tensor $\hat{\mathcal{V}}_{dn}$ represent the spatial information in the x axis direction, and the second and fourth dimensions represent the spatial information in the y axis direction; to this end, the dimension sets $\mathbb{J}_1=\{1, 3\}$ and $\mathbb{J}_2\{2, 4\}$ are defined, and a fourth-order virtual domain signal $\hat{\mathcal{V}}_\mathbb{W} \in \mathbb{C}^{|\mathbb{L}_1|^2\times|\mathbb{L}_2|^2}$ corresponding to the non-continuous virtual cross array $\mathbb{W}$ is obtained by performing the tensor transformation of dimension merging on the denoised sampling covariance tensor $\hat{\mathcal{V}}_{dn}$:

$$\hat{\mathcal{V}}_\mathbb{W} \triangleq \hat{\mathcal{V}}_{dn(\mathbb{J}_1,\mathbb{J}_2)} = \sum_{k=1}^{K}\left(\frac{1}{T}s_k^T s_k^*\right)[a^*_{\mathbb{L}_1}(k) \otimes a_{\mathbb{L}_1}(k)] \circ [a_{\mathbb{L}_2}(k) \otimes a^*_{\mathbb{L}_2}(k)],$$

wherein, by forming difference set arrays on the exponential term, respectively, $$a^*_{\mathbb{L}_1}(k) \otimes a_{\mathbb{L}_1}(k) \text{ and } a_{\mathbb{L}_2}(k) \otimes a^*_{\mathbb{L}_2}(k)$$

construct the augmented virtual linear arrays on the x axis and y axis, and $\otimes$ represents the Kronecker product. $\mathbb{W}$ contains a virtual uniform cross array $\mathbb{V} = \mathbb{V}_x \cup \mathbb{V}_y$, the structure of $\mathbb{V}$ is shown in FIG. 3, where $\mathbb{V}_x$ and $\mathbb{V}_y$ are virtual uniform linear arrays corresponding to the x axis and y axis, respectively. The positions of all virtual array elements in $\mathbb{V}_x$ and $\mathbb{V}_y$ are respectively $$\mathbb{V}_x = \{(x_\mathbb{V}, 0) | x_\mathbb{V} = [q_{\mathbb{V}_x}^{(1)}, q_{\mathbb{V}_x}^{(2)}, \ldots, q_{\mathbb{V}_x}^{(|\mathbb{V}_x|)}]d\} \text{ and } \mathbb{V}_y =$$
$$\left\{(0, y_\mathbb{V}) | y_\mathbb{V} = \left[q_{\mathbb{V}_y}^{(1)}, q_{\mathbb{V}_y}^{(2)}, \ldots, q_{\mathbb{V}_y}^{(|\mathbb{V}_y|)}\right]d\right\},$$

where $$q_{\mathbb{V}_x}^{(1)} = -M_{L_1}N_{L_1} - M_{L_1} + 2,\ q_{\mathbb{V}_x}^{(|\mathbb{V}_x|)} = M_{L_1}N_{L_1} + M_{L_1},$$
$$q_{\mathbb{V}_y}^{(1)} = -M_{L_2}N_{L_2} - M_{L_2} + 2,\ q_{\mathbb{V}_y}^{(|\mathbb{V}_y|)} = M_{L_2}N_{L_2} + M_{L_2},$$
$$\text{and } |\mathbb{V}_x| = 2(M_{L_1}N_{L_1} + M_{L_1}) - 1,\ |\mathbb{V}_y| = 2(M_{L_2}N_{L_2} + M_{L_2}) - 1.$$

The elements corresponding to the positions of all virtual array elements in the virtual uniform cross array $\mathbb{V}$ are extracted from the virtual domain signal $\hat{V}_\mathbb{W}$ of the non-continuous virtual cross array $\mathbb{W}$ to obtain the virtual domain signal $\hat{U}_\mathbb{V} \in \mathbb{C}^{|\mathbb{V}_x| \times |\mathbb{V}_y|}$ corresponding to $\mathbb{V}$, which is modeled as follows:

$$\hat{U}_\mathbb{V} = \sum_{k=1}^{K} \left(\frac{1}{T} s_k^T s_k^*\right) g_x(k) \circ g_y(k),$$

wherein:

$$g_x(k) = \left[e^{-j\pi q_{\mathbb{V}_x}^{(1)} \mu_1(k)},\ e^{-j\pi q_{\mathbb{V}_x}^{(2)} \mu_1(k)},\ \ldots,\ e^{-j\pi q_{\mathbb{V}_x}^{(|\mathbb{V}_x|)} \mu_1(k)}\right]^T,$$
$$g_y(k) = \left[e^{-j\pi q_{\mathbb{V}_y}^{(1)} \mu_2(k)},\ e^{-j\pi q_{\mathbb{V}_y}^{(2)} \mu_2(k)},\ \ldots,\ e^{-j\pi q_{\mathbb{V}_y}^{(|\mathbb{V}_y|)} \mu_2(k)}\right]^T,$$

are steering vectors of $\mathbb{V}_x$ and $\mathbb{V}_y$, respectively,

Step 6: constructing a denoised structured virtual domain tensor. Considering the two virtual uniform linear arrays $\mathbb{V}_x$ and $\mathbb{V}_y$ that make up the virtual uniform cross array $\mathbb{V}$ are respectively symmetric about the x=1 axis and y=1 axis, respectively extracting sub-arrays $$\mathbb{Q}_x^{(1)} = \{(x_\mathbb{Q}^{(1)}, 0) | x_\mathbb{Q}^{(1)} = [1, 2, \ldots, q_{\mathbb{Q}_x}^{(|\mathbb{Q}_x|)}]d\},$$
$$\mathbb{Q}_y^{(1)} = \left\{(0, y_\mathbb{Q}^{(1)}) | y_\mathbb{Q}^{(1)} = [1, 2, \ldots, q_{\mathbb{Q}_y}^{(|\mathbb{Q}_y|)}]d\right\}$$

from $\mathbb{V}_x$ and $\mathbb{V}_y$ as translation windows; then, respectively translating the translation windows $$\mathbb{Q}_x^{(1)} \text{ and } \mathbb{Q}_y^{(1)}$$

along a negative semi-axis direction of the x axis and the y axis by a virtual array element interval d, to obtain $J_x$ virtual uniform linear sub-arrays $$\mathbb{Q}_x^{(j_x)} = \{(x_\mathbb{Q}^{(j_x)}, 0) | x_\mathbb{Q}^{(j_x)} = [2 - j_x, 3 - j_x, \ldots, q_{\mathbb{Q}_x}^{(|\mathbb{Q}_x|)} + 1 - j_x]d\}$$

and $J_y$ virtual uniform linear sub-arrays $$\mathbb{Q}_y^{(j_y)} = \left\{(0, y_\mathbb{Q}^{(j_y)}) | y_\mathbb{Q}^{(j_y)} = [2 - j_y, 3 - j_y, \ldots, q_{\mathbb{Q}_y}^{(|\mathbb{Q}_y|)} + 1 - j_y]d\right\},$$

as shown in FIG. 3. Here, $j_x=1, 2, \ldots, J_x$, $j_y=1, 2, \ldots, J_y$, $J_x=(|\mathbb{V}_x|+1)/2$, $J_y=(|\mathbb{V}|+1)/2$, and the virtual domain signal corresponding to the virtual uniform sub-array $$\tilde{\mathbb{Q}}_{(j_x, j_y)} = \mathbb{Q}_x^{(j_x)} \cup \mathbb{Q}_y^{(j_y)}$$

can be expressed as $$U_{\tilde{\mathbb{Q}}_{(j_x, j_y)}} \text{ and } U_{\tilde{\mathbb{Q}}_{(j_x, j_y+1)}}$$

There is a one-step translation relationship in the y axial direction between the virtual domain signals $$U_{\tilde{\mathbb{Q}}_{(j_x, j_y)}} \text{ and } U_{\tilde{\mathbb{Q}}_{(j_x, j_y+1)}}$$

with adjacent index subscripts. Similarly, there is a one-step translation relationship in the x axial direction between $$U_{\tilde{\mathbb{Q}}_{(j_x, j_y)}} \text{ and } U_{\tilde{\mathbb{Q}}_{(j_x, j_y+1)}}.$$

Therefore, these virtual domain signals are stacked into structured virtual domain tensors. Specifically, the index subscript of $j_y$ is fixed, $$U_{\tilde{\mathbb{Q}}_{(:, j_y)}}$$

is superimposed on the third dimension to obtain $J_y$ three-dimensional virtual domain tensors. Then, the $J_y$ three-dimensional virtual domain tensors are superimposed in the fourth dimension to obtain a denoised structured virtual domain tensor $\tilde{\mathcal{U}} \in \mathbb{C}^{J_x \times J_y \times J_x \times J_y}$, which is expressed as follows:

$$\tilde{\mathcal{U}} = \sum_{k=1}^{K} \left(\frac{1}{T} s_k^T s_k^*\right) l_x(k) \circ l_y(k) \circ v_x(k) \circ v_y(k),$$

wherein:

$$l_x(k) = \left[e^{-j\pi\mu_1(k)},\ e^{-j\pi 2\mu_1(k)},\ \ldots,\ e^{-j\pi q_{\mathbb{Q}_x}^{(|\mathbb{Q}_x|)} \mu_1(k)}\right]^T,$$
$$l_y(k) = \left[e^{-j\pi\mu_2(k)},\ e^{-j\pi 2\mu_2(k)},\ \ldots,\ e^{-j\pi q_{\mathbb{Q}_y}^{(|\mathbb{Q}_y|)} \mu_2(k)}\right]^T,$$

are steering vectors of $Q_x^{(1)}$ and $Q_y^{(1)}$, respectively, $$v_x(k) = \left[1, \ e^{-j\pi\mu_1(k)}, \ldots, e^{-j\pi\left(q_{Q_K}^{(|Q_K|)}-1\right)\mu_1(k)}\right]^T,$$

$$v_y(k) = \left[1, \ e^{-j\pi\mu_2(k)}, \ldots, e^{-j\pi\left(q_{Q_y}^{(|Q_y|)}-1\right)\mu_2(k)}\right]^T,$$

are translation factors along the x axis and the y axis, respectively.

Step 7: obtaining a direction of arrival estimation result through structured virtual domain tensor decomposition. Using the constructed denoised structured virtual domain tensor $\tilde{\mathcal{U}}$, performing tensor decomposition on it by Canonical Polyadic Decomposition (CPD) to obtain the estimated value of each spatial factor $\tilde{\mathcal{U}}$, that is, $\{\hat{l}_x(k), \hat{l}_y(k), \hat{v}_x(k), \hat{v}_y(k)\}$; extracting the parameters $\mu_1(k)$ and $\mu_2(k)$ from $\{\hat{l}_x(k), \hat{l}_y(k), \hat{v}_x(k), \hat{v}_y(k)\}$:

$$\hat{\mu}_1(k) = \angle\left(\hat{l}_x^T(k)\hat{v}_x(k)/J_x\right)/\pi,$$

$$\hat{\mu}_2(k) = \angle\left(\hat{l}_y^T(k)\hat{v}_y(k)/J_y\right)/\pi,$$

wherein, $\angle(\cdot)$ represents an operation of taking the argument of a complex number. Finally, the closed-form solution of the two-dimensional direction of arrival estimation $(\hat{\theta}_k, \hat{\varphi}_k)$ is obtained according to the relationship between the parameter $\{\mu_1(k), \mu_2(k)\}$ and the two-dimensional direction of arrival $(\theta_k, \varphi_k)$, that is, $\mu_1(k)=\sin(\varphi_k)\cos(\theta_k)$ and $\mu_2(k)=\sin(\varphi_k)\sin(\theta_k)$:

$$\hat{\theta}_k = \arctan\left(\frac{\hat{\mu}_2(k)}{\hat{\mu}_1(k)}\right),$$

$$\hat{\varphi}_k = \sqrt{\hat{\mu}_1(k)^2 + \hat{\mu}_2(k)^2};$$

According to a uniqueness condition of the CPD, the following condition must be met for performing CPD on the tensor $\tilde{\mathcal{U}}$:

$$\kappa(\hat{L}_x) + \kappa(\hat{L}_y) + \kappa(\hat{V}_x) + \kappa(\hat{V}_y) \geq 2K+3,$$

wherein, $\kappa(\cdot)$ represents a Kruskal rank of the matrix, $\hat{L}_x = [\hat{l}_x(1), \hat{l}_x(2), \ldots \hat{l}_x(K)] \in \mathbb{C}^{J_x \times K}$, $\hat{L}_y = [\hat{l}_y(1), \hat{l}_y(2), \ldots \hat{l}_y(K)] \in \mathbb{C}^{J_y \times K}$, $\hat{V}_x = [\hat{v}_x(1), \hat{v}_x(2), \ldots \hat{v}_x(K)] \in \mathbb{C}^{J_x \times K}$ and $\hat{V}_y = [\hat{v}_y(1), \hat{v}_y(2), \ldots \hat{v}_y(K)] \in \mathbb{C}^{J_y \times K}$ are the factor matrices of $\tilde{\mathcal{U}}$; $\kappa(\hat{L}_x)=\min(J_x, K)$, $\kappa(\hat{L}_y)=\min(J_y, K)$, $\kappa(\hat{V}_x)=\min(J_x, K)$ and $\kappa(\hat{V}_y)=\min(J_y, K)$ are substituted into the uniqueness conditional inequality of the CPD to obtain $K \leq \lfloor(|\mathbb{V}_x|+|\mathbb{V}_y|-1)/2\rfloor$, where $\lfloor \cdot \rfloor$ represents a round-up operation; therefore, the maximum target number of the direction of arrival estimation that can be achieved in the proposed method of the present invention is $\lfloor(|\mathbb{V}_x|+|\mathbb{V}_y|-1)/2\rfloor$.

The effects of the present invention will be further described below in conjunction with a simulation example.

Figure 4:
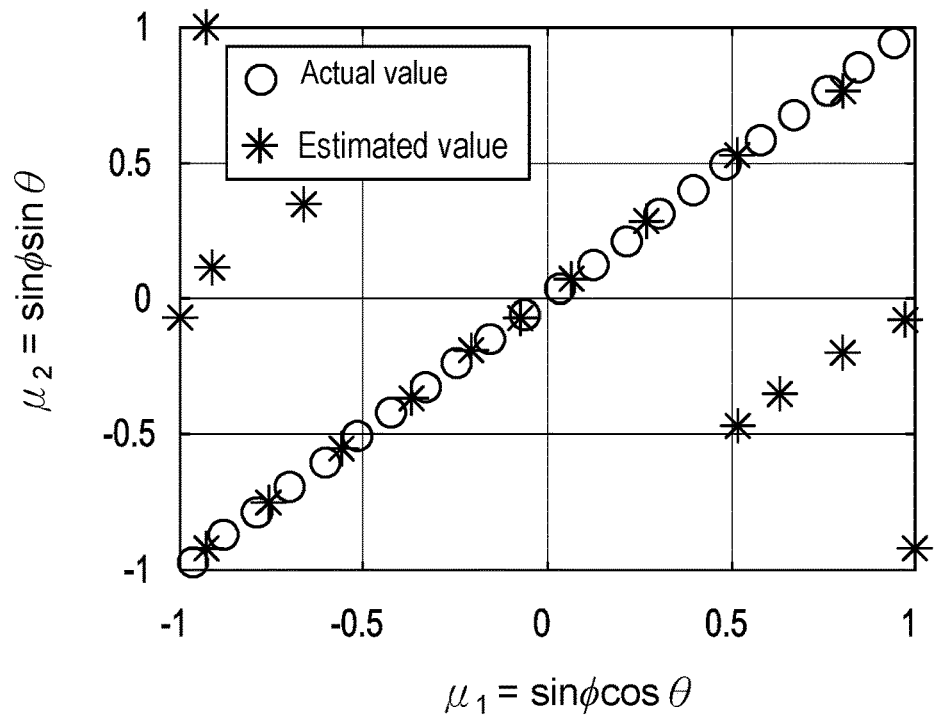
FIG. 4 is a graph of estimation results of two-dimensional underdetermined direction of arrival of a traditional Tensor MUSIC method.
Figure 5:
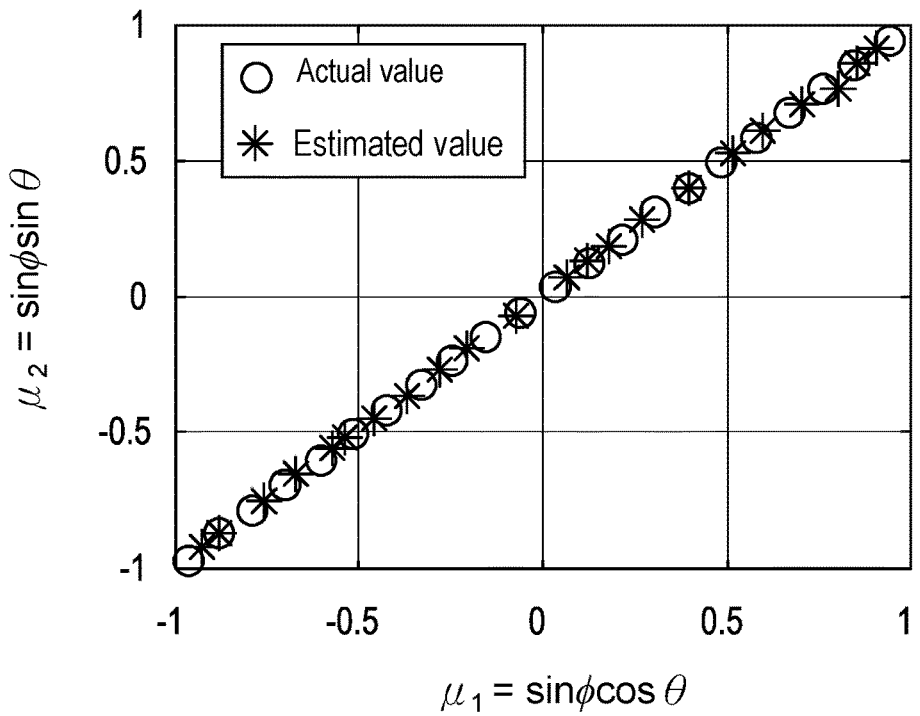
FIG. 5 is a graph of estimation results of two-dimensional underdetermined direction of arrival of the method proposed by the present invention.

The simulation example: the sub-array partition L-shaped coprime array is used to receive the incident signals, and its parameters are selected as $M_{\mathbb{L}_1}=M_{\mathbb{L}_2}=2$, $N_{\mathbb{L}_1}=N_{\mathbb{L}_2}=3$, that is, the constructed L-shaped coprime array contains $2M_{\mathbb{L}_1}+N_{\mathbb{L}_1}+2M_{\mathbb{L}_2}+N_{\mathbb{L}_2}-2=12$ antenna elements. Assuming that there are 22 incident narrowband signals, the two-dimensional parameters $\mu_1(k)$ and $\mu_2(k)$ of the direction of arrival are uniformly distributed on $[-0.97, 0.97]$ respectively. Subvariance combination weights are $\lambda_1=1$, $\lambda_2=0.25$, $\lambda_3=1$. Comparing the method for estimating a direction of arrival of a sub-array partition type L-shaped coprime array based on fourth-order sampling covariance tensor denoising proposed by the present invention and the traditional TensorMultiple Signal Classification (Tensor MUSIC) method, under the condition that the signal-to-noise ratio is SNR=−5 dB and the number of sampling snapshots is T=500, the two-dimensional direction of arrival estimation performance of the above methods under the underdetermined condition are shown in FIG. 4 and FIG. 5, respectively.

It can be seen that under the underdetermined condition, the method proposed in the present invention can accurately estimate the two-dimensional direction of arrival of all signal sources, while the Tensor MUSIC method cannot effectively estimate the two-dimensional direction of arrival of all signal sources. Compared with the traditional Tensor MUSIC method, the method proposed in the present invention realizes the accurate estimation of the two-dimensional direction of arrival under the premise of suppressing noise power and sampling high-order noise interference by constructing a denoised virtual domain tensor. Under the underdetermined condition, it has better performance of direction of arrival estimation.

To sum up, the present invention exploits the statistical distribution characteristics of the high-order sampling covariance tensor by constructing the correlation between the multi-dimensional virtual domain of the L-shaped coprime array and the denoising high-order tensor statistics, and designs the denoising processing method of high-order sampling covariance tensor; furthermore, a structured space segmentation and superposition mechanism for denoising high-order virtual domain signals is established, so as to construct a denoised structured virtual domain tensor, and through performing the tensor decomposition on it, the accurate estimation of the two-dimensional direction of arrival is achieved, and its closed-form solution is given.

The above descriptions are only preferred embodiments of the present invention. Although the present invention has been disclosed above with preferred examples, it is not intended to limit the present invention. Any person skilled in the art, without departing from the scope of the technical solutions of the present invention, can make many possible changes and modifications to the technical solution of the present invention by using the methods and technical contents disclosed above, or modify them into equivalent examples having equivalent changes. Therefore, any simple modification, equivalent change and modification made to the above embodiments according to the technical essence of the present invention without departing from the contents of the technical solutions of the present invention still fall within the protection scope of the technical solutions of the present invention.

What is claimed is:

1. A method for estimating a direction of arrival of a sub-array partition type L-shaped coprime array based on fourth-order sampling covariance tensor denoising, wherein the method comprises the following steps:

(1) constructing a linear sub-array partition type L-shaped coprime array using $2M_{\mathbb{L}_1}+N_{\mathbb{L}_1}+2M_{\mathbb{L}_2}+N_{\mathbb{L}_2}-2$ physical antenna array elements, wherein the L-shaped coprime array consists of two coprime linear arrays $\mathbb{L}_i$, i=1, 2 located on an x axis and a y axis, and first array elements of the two coprime linear arrays $\mathbb{L}_1$ and $\mathbb{L}_2$ are laid out from positions corresponding to a coordinate of 1 on the x axis and to a coordinate of 1 on the y axis respectively; the coprime linear array $\mathbb{L}_i$ contains $|\mathbb{L}_i|=2M_{\mathbb{L}_i}+N_{\mathbb{L}_i}-1$ array elements, and wherein $M_{\mathbb{L}_i}$ and $N_{\mathbb{L}_i}$ are a pair of coprime integers, $M_{\mathbb{L}_i} < N_{\mathbb{L}_i}$, $|\cdot|$ represents a potential of a set;

$$\{(x_{\mathbb{L}_1}, 0) | x_{\mathbb{L}_1} = [c_{\mathbb{L}_1}^{(1)}, c_{\mathbb{L}_1}^{(2)}, \ldots, c_{\mathbb{L}_1}^{(|\mathbb{L}_1|)}]d\}$$

$$\text{and } \{(0, y_{\mathbb{L}_2}) | y_{\mathbb{L}_2} = [c_{\mathbb{L}_2}^{(1)}, c_{\mathbb{L}_2}^{(2)}, \ldots, c_{\mathbb{L}_2}^{(|\mathbb{L}_2|)}]d\}$$

are respectively used to represent a position of each array element of the L-shaped coprime array on the x axis and y axis, wherein $$c_{\mathbb{L}_1}^{(1)} = c_{\mathbb{L}_2}^{(1)} = 1,$$

and a unit interval d is taken as half of a wavelength of an incident narrowband signal;

(2) modeling, for K far-field narrow-band incoherent signal sources from $\{(\theta_1, \varphi_1), (\theta_2, \varphi_2), \ldots, (\theta_K, \varphi_K)\}$ directions, where K is an integer greater than or equal to one, a received signal of the coprime linear array $\mathbb{L}_i$ forming the L-shaped coprime array as follows:

$$X_{\mathbb{L}_i} = \sum_{k=1}^{K} a_{\mathbb{L}_i}(k) \circ s_k + N_{\mathbb{L}_i} \in \mathbb{C}^{|\mathbb{L}_i| \times T},$$

wherein, $s_k=[s_{k,1}, s_{k,2}, \ldots, s_{k,T}]^T$ is a multi-snapshot sampling signal waveform corresponding to a kth incident signal source, T is the number of sampling snapshots, $\circ$ represents an outer product of a vector, $N_{\mathbb{L}_i}$ is noise independent of each signal source, $a_{\mathbb{L}_i}(k)$ is a steering vector of $\mathbb{L}_i$, and corresponds to a signal source having an incoming wave direction of $(\theta_k, \varphi_k)$ and is expressed as follows:

$$a_{\mathbb{L}_i}(k) = \left[e^{-j\pi c_{\mathbb{L}_i}^{(1)} \mu_i(k)}, e^{-j\pi c_{\mathbb{L}_i}^{(2)} \mu_i(k)}, \ldots, e^{-j\pi c_{\mathbb{L}_i}^{(|\mathbb{L}_i|)} \mu_i(k)}\right]^T,$$

wherein, $\mu_1(k)=\sin(\varphi_k)\cos(\theta_k)$, $\mu_2(k)=\sin(\varphi_k)\sin(\theta_k)$, $j=\sqrt{-1}$, $[\cdot]^T$ represents a transpose operation; a second-order cross-correlation matrix $R_{\mathbb{L}_1 \mathbb{L}_2} \in \mathbb{C}^{|\mathbb{L}_1| \times |\mathbb{L}_2|}$ obtained by solving cross-correlation statistics of $X_{\mathbb{L}_1}$ and $X_{\mathbb{L}_2}$:

$$R_{\mathbb{L}_1 \mathbb{L}_2} = E\{X_{\mathbb{L}_1} X_{\mathbb{L}_2}^H\} = \sum_{k=1}^{K} \sigma_k^2 a_{\mathbb{L}_1}(k) \circ a_{\mathbb{L}_2}^*(k),$$

and wherein, $$\sigma_k^2 = E\{s_k(t) s_k^*(t)\}$$

represents power of the kth incident signal source, $E\{\cdot\}$ represents a mathematical expectation operation, $(\cdot)^H$ represents a conjugate transpose operation, $(\cdot)^*$ represents a conjugate operation;

(3) calculating an autocorrelation of the second-order cross-correlation matrix $R_{\mathbb{L}_1 \mathbb{L}_2}$ to obtain a fourth-order covariance tensor $\mathcal{V} \in \mathbb{C}^{|\mathbb{L}_1| \times |\mathbb{L}_2| \times |\mathbb{L}_1| \times |\mathbb{L}_2|}$:

$$V = R_{\mathbb{L}_1 \mathbb{L}_2} \circ R_{\mathbb{L}_1 \mathbb{L}_2}^* = E\{(X_{\mathbb{L}_1} X_{\mathbb{L}_2}^H) \circ (X_{\mathbb{L}_1} X_{\mathbb{L}_2}^H)^*\}$$

$$= \sum_{k=1}^{K} \sigma_k^4 a_{\mathbb{L}_1}(k) \circ a_{\mathbb{L}_2}^*(k) \circ a_{\mathbb{L}_1}^*(k) \circ a_{\mathbb{L}_2}(k);$$

wherein, the fourth-order covariance tensor is approximated by a fourth-order sampling covariance tensor $\hat{\mathcal{V}} \in \mathbb{C}^{|\mathbb{L}_1| \times |\mathbb{L}_2| \times |\mathbb{L}_1| \times |\mathbb{L}_2|}$, that is:

$$\hat{V} = \left(\frac{1}{T} X_{\mathbb{L}_1} X_{\mathbb{L}_2}^H\right) \circ \left(\frac{1}{T} X_{\mathbb{L}_1} X_{\mathbb{L}_2}^H\right)^* =$$

$$\sum_{k=1}^{K} \left(\frac{1}{T} s_k^T s_k^*\right) a_{\mathbb{L}_1}(k) \circ a_{\mathbb{L}_2}^*(k) \circ a_{\mathbb{L}_1}^*(k) \circ a_{\mathbb{L}_2}(k) + \mathcal{Z},$$

wherein:

$$z = \left[\frac{1}{T}\sum_{k=1}^{K} a_{\mathbb{L}_1}(k) \circ (s_k^T N_{\mathbb{L}_2}^H) + \frac{1}{T}\sum_{k=1}^{K} a_{\mathbb{L}_2}(k) \circ (s_k^T N_{\mathbb{L}_1}^H) + \frac{1}{T} N_{\mathbb{L}_1} N_{\mathbb{L}_2}^H\right]$$

$$\left[\frac{1}{T}\sum_{k=1}^{K} a_{\mathbb{L}_1}(k) \circ (s_k^T N_{\mathbb{L}_2}^H) + \frac{1}{T}\sum_{k=1}^{K} a_{\mathbb{L}_2}(k) \circ (s_k^T N_{\mathbb{L}_1}^H) + \frac{1}{T} N_{\mathbb{L}_1} N_{\mathbb{L}_2}^H\right]^*$$

is a fourth-order sampling noise tensor; the $(\tau_1, \varsigma_1, \tau_2, \varsigma_2)$th element in $\mathcal{Z}$ is represented as $\mathcal{Z}_{(\tau_1, \varsigma_1, \tau_2, \varsigma_2)}$, $\tau_1, \tau_2=1, 2, \ldots, |\mathbb{L}_1|$, $\varsigma_1, \varsigma_2=1, 2, \ldots, |\mathbb{L}_2|$, $\mathcal{Z}_{(\tau_1, \varsigma_1, \tau_2, \varsigma_2)}$ obeys an approximate complex Gaussian distribution, and an approximate variance thereof $\bar{\sigma}^2$ is expressed as:

$$\bar{\sigma}^2 = \frac{1}{T^2}\left[\lambda_1 \left(\sigma_n^2 \sum_{k=1}^{K} \sigma_k^2\right)^2 + \lambda_2 \sigma_n^6 \sum_{k=1}^{K} \sigma_k^2 + \lambda_3 \sigma_n^8\right],$$

and wherein, $\lambda_1$, $\lambda_2$ and $\lambda_3$ represent a combined weight of three sub-variance terms $$\left(\sigma_n^2 \sum_{k=1}^{K} \sigma_k^2\right)^2, \sigma_n^6 \sum_{k=1}^{K} \sigma_k^2$$

and $$\sigma_n^8, \sigma_n^2$$

represents a noise power;

(4) performing high-order singular value decomposition on the fourth-order sampling covariance tensor $\hat{\mathcal{V}}$:

$$\hat{\mathcal{V}} = \mathcal{S} \times_1 Y^{(1)} \times_2 Y^{(2)} \times_3 Y^{(3)} \times_4 Y^{(4)},$$

wherein, $\mathcal{S}_{(\tau_1,\varsigma_1,\tau_2,\varsigma_2)}$ represents a kernel tensor, which contains projections from signal and noise components in $\hat{\mathcal{V}}$, $Y^{(1)} \in \mathbb{C}^{|\mathbb{L}_1| \times |\mathbb{L}_1|}$, $Y^{(2)} \in \mathbb{C}^{|\mathbb{L}_2| \times |\mathbb{L}_2|}$, $Y^{(3)} \in \mathbb{C}^{|\mathbb{L}_1| \times |\mathbb{L}_1|}$ and $Y^{(4)} \in \mathbb{C}^{|\mathbb{L}_2| \times |\mathbb{L}_2|}$ represent singular matrices corresponding to four dimensions of $\hat{\mathcal{V}}$; a thresholding is performed on $\mathcal{S}$, that is, elements in $\mathcal{S}$ that are less than or equal to a noise threshold $\epsilon$ are set to zero, and elements larger than the noise threshold $\epsilon$ are reserved, thus obtaining a thresholded kernel tensor $\mathcal{S}_{dn}$, where an element in $\mathcal{S}_{dn}$ is expressed as follows:

$$\mathcal{S}_{dn(\tau_1,\varsigma_1,\tau_2,\varsigma_2)} = \begin{cases} \mathcal{S}_{(\tau_1,\varsigma_1,\tau_2,\varsigma_2)} & |\mathcal{S}_{(\tau_1,\varsigma_1,\tau_2,\varsigma_2)}| > \epsilon, \\ 0 & |\mathcal{S}_{(\tau_1,\varsigma_1,\tau_2,\varsigma_2)}| \leq \epsilon, \end{cases}$$

and wherein, $\mathcal{S}_{(\tau_1,\varsigma_1,\tau_2,\varsigma_2)}$ represents a $(\tau_1, \varsigma_1, \tau_2, \varsigma_2)$th element of $\mathcal{S}$, the noise threshold $\epsilon$ is as follows:

$$\epsilon = \hat{\sigma}^2 \sqrt{2\log(|\mathbb{L}_1||\mathbb{L}_2||\mathbb{L}_1||\mathbb{L}_2|)};$$

the thresholded kernel tensor $\mathcal{S}_{dn}$ is multiplied with the four singular matrices $Y^{(1)}$, $Y^{(2)}$, $Y^{(3)}$ and $Y^{(4)}$ to obtain a denoised sampling covariance tensor $\hat{\mathcal{V}}_{dn}$, which is expressed as follows:

$$\hat{\mathcal{V}}_{dn} = \mathcal{S}_{dn} \times_1 Y^{(1)} \times_2 Y^{(2)} \times_3 Y^{(3)} \times_4 Y^{(4)};$$

(5) defining dimension sets $\mathbb{J}_1 = \{1,3\}$ and $\mathbb{J}_2 = \{2,4\}$, and obtaining a fourth-order virtual domain signal $\hat{\mathcal{V}}_{\mathbb{W}} \in \mathbb{C}^{|\mathbb{L}_1|^2 \times |\mathbb{L}_2|^2}$ by performing tensor transformation of dimension merging on the denoised sampling covariance tensor $\hat{\mathcal{V}}_{dn}$:

$$\hat{\mathcal{V}}_{\mathbb{W}} \triangleq \hat{\mathcal{V}}_{dn_{\{\mathbb{J}_1, \mathbb{J}_2\}}} = \sum_{k=1}^{K} \left(\frac{1}{T} s_k^T s_k^*\right) \left[a_{\mathbb{L}_1}^*(k) \otimes a_{\mathbb{L}_1}(k)\right] \circ \left[a_{\mathbb{L}_2}(k) \otimes a_{\mathbb{L}_2}^*(k)\right],$$

wherein, for $$a_{\mathbb{L}_1}^*(k) \otimes a_{\mathbb{L}_1}(k) \text{ and } a_{\mathbb{L}_2}(k) \otimes a_{\mathbb{L}_2}^*(k),$$

by forming a difference set array on exponent terms respectively, augmented virtual linear arrays on the x axis and on the y axis are constructed, $\otimes$ representing a Kronecker product; $\hat{\mathcal{V}}_{\mathbb{W}}$ corresponds to a two-dimensional non-continuous virtual cross array $\mathbb{W}$, $\mathbb{W}$ contains a virtual uniform cross array $\mathbb{V} = \mathbb{V}_x \cup \mathbb{V}_y$, where $\mathbb{V}_x$ and $\mathbb{V}_y$ are respectively virtual uniform linear arrays on the x axis and the y axis; positions of all virtual array elements in $\mathbb{V}_x$ and $\mathbb{V}_y$ are respectively expressed as $$\mathbb{V}_x = \{(x_{\mathbb{V}}, 0) | x_{\mathbb{V}} = [q_{\mathbb{V}_x}^{(1)}, q_{\mathbb{V}_x}^{(2)}, \ldots, q_{\mathbb{V}_x}^{(|\mathbb{V}_x|)}]d\} \text{ and }$$

$$\mathbb{V}_y = \{(0, y_{\mathbb{V}}) | y_{\mathbb{V}} = [q_{\mathbb{V}_y}^{(1)}, q_{\mathbb{V}_y}^{(2)}, \ldots, q_{\mathbb{V}_y}^{(|\mathbb{V}_y|)}]d\},$$

where $$q_{\mathbb{V}_x}^{(1)} = -M_{\mathbb{L}_1} N_{\mathbb{L}_1} - M_{\mathbb{L}_1} + 2, q_{\mathbb{V}_x}^{(|\mathbb{V}_x|)} = M_{\mathbb{L}_1} N_{\mathbb{L}_1} + M_{\mathbb{L}_1},$$

$$q_{\mathbb{V}_y}^{(1)} = -M_{\mathbb{L}_2} N_{\mathbb{L}_2} - M_{\mathbb{L}_2} + 2, q_{\mathbb{V}_y}^{(|\mathbb{V}_y|)} = M_{\mathbb{L}_2} N_{\mathbb{L}_2} + M_{\mathbb{L}_2},$$

and $|\mathbb{V}_x| = 2(M_{\mathbb{L}_1} N_{\mathbb{L}_1} + M_{\mathbb{L}_1}) - 1, |\mathbb{V}_y| = 2(M_{\mathbb{L}_2} N_{\mathbb{L}_2} + M_{\mathbb{L}_2}) - 1;$ elements corresponding to positions of all virtual array elements in the virtual uniform cross array $\mathbb{V}$ are extracted from the virtual domain signal $\hat{\mathcal{V}}_{\mathbb{W}}$ of a non-contiguous virtual cross array $\mathbb{W}$ to obtain a fourth-order virtual domain signal $\hat{U}_{\mathbb{V}} \in \mathbb{C}^{|\mathbb{V}_x| \times |\mathbb{V}_y|}$ corresponding to $\mathbb{V}$;

(6) respectively extracting sub-arrays $$\mathbb{Q}_x^{(1)} = \{(x_{\mathbb{Q}}^{(1)}, 0) | x_{\mathbb{Q}}^{(1)} = [1, 2, \ldots, q_{\mathbb{Q}_x}^{(|\mathbb{Q}_x|)}]d\},$$

$$\mathbb{Q}_y^{(1)} = \{(0, y_{\mathbb{Q}}^{(1)}) | y_{\mathbb{Q}}^{(1)} = [1, 2, \ldots, q_{\mathbb{Q}_y}^{(|\mathbb{Q}_y|)}]d\}$$

from $\mathbb{V}_x$ and $\mathbb{V}_y$ as translation windows; then, respectively translating the translation windows $$\mathbb{Q}_x^{(1)} \text{ and } \mathbb{Q}_y^{(1)}$$

along a negative semi-axis direction of the axis x and the axis y by a virtual array element interval d, to obtain $J_x$ virtual uniform linear sub-arrays $$\mathbb{Q}_x^{(j_x)} = \{(x_{\mathbb{Q}}^{(j_x)}, 0) | x_{\mathbb{Q}}^{(j_x)} = [2 - j_x, 3 - j_x, \ldots, q_{\mathbb{Q}_x}^{(|\mathbb{Q}_x|)} + 1 - j_x]d\}$$

and $J_y$ virtual uniform linear sub-arrays $$\mathbb{Q}_y^{(j_y)} = \{(0, y_{\mathbb{Q}}^{(j_y)}) | y_{\mathbb{Q}}^{(j_y)} = [2 - j_y, 3 - j_y, \ldots, q_{\mathbb{Q}_y}^{(|\mathbb{Q}_y|)} + 1 - j_y]d\},$$

$j_x = 1, 2, \ldots, J_x$, $j_y = 1, 2, \ldots, J_y$, $J_x = (|\mathbb{V}_x| + 1)/2$, $J_y = (|\mathbb{V}_y| + 1)/2$, so that a virtual domain signal corresponding to a virtual uniform sub-array $$\tilde{\mathbb{Q}}_{(j_x, j_y)} = \mathbb{Q}_x^{(j_x)} \cup \mathbb{Q}_y^{(j_y)}$$

be expressed as $$U_{\tilde{\mathbb{Q}}_{(j_x, j_y)}} \in \mathbb{C}^{J_x \times J_y};$$

fixing $j_y$ index, superimposing $$U_{\tilde{\mathbb{Q}}_{(:,j_y)}}$$

in a third dimension to obtain $J_y$ three-dimensional virtual domain tensors, and then, superimposing the $J_y$ three-dimensional virtual domain tensors in a fourth dimension to obtain a four-dimensional denoised structured virtual domain tensor $\tilde{\mathcal{U}} \in \mathbb{C}^{J_x \times J_y \times J_x \times J_y}$, which is expressed as follows:

$$\tilde{\mathcal{U}} = \sum_{k=1}^{K} \left(\frac{1}{T} s_k^T s_k^*\right) l_x(k) \cdot l_y(k) \cdot v_x(k) \cdot v_y(k),$$

wherein:

$$l_x(k) = \left[e^{-j\pi\mu_1(k)}, e^{-j\pi 2\mu_1(k)}, \ldots, e^{-j\pi q_{\mathbb{Q}_x}^{(|\mathbb{Q}_x|)}\mu_1(k)}\right]^T,$$

$$l_y(k) = \left[e^{-j\pi\mu_2(k)}, e^{-j\pi 2\mu_2(k)}, \ldots, e^{-j\pi q_{\mathbb{Q}_y}^{(|\mathbb{Q}_y|)}\mu_2(k)}\right]^T,$$

are steering vectors of $$\mathbb{Q}_x^{(1)} \text{ and } \mathbb{Q}_y^{(1)},$$

respectively, $$v_x(k) = \left[1, e^{-j\pi\mu_1(k)}, \ldots, e^{-j\pi\left(q_{\mathbb{Q}_x}^{(|\mathbb{Q}_x|)}-1\right)\mu_1(k)}\right]^T,$$

$$v_y(k) = \left[1, e^{-j\pi\mu_2(k)}, \ldots, e^{-j\pi\left(q_{\mathbb{Q}_y}^{(|\mathbb{Q}_y|)}-1\right)\mu_2(k)}\right]^T,$$

are translation factors along the x axis and the y axis, respectively; and (7) performing tensor decomposition on the denoised structured virtual domain tensor $\tilde{\mathcal{U}}$ by canonical polyadic decomposition (CPD) to obtain an estimated value of each spatial factor of $\tilde{\mathcal{U}}$, that is, $\{\hat{l}_x(k),\hat{l}_y(k),\hat{v}_x(k),\hat{v}_y(k)\}$; extracting parameters $\hat{\mu}_1(k)$ and $\hat{\mu}_2(k)$ from $\{\hat{l}_x(k),\hat{l}_y(k),\hat{v}_x(k),\hat{v}_y(k)\}$, and obtaining a closed-form solution of a two-dimensional direction of arrival estimation $(\hat{\theta}_k, \hat{\varphi}_k)$ according to a relationship between $\{\mu_1(k), \mu_2(k)\}$ and a two-dimensional direction of arrival $(\theta_k, \varphi_k)$.

2. The method for estimating a direction of arrival of a sub-array partition type L-shaped coprime array based on fourth-order sampling covariance tensor denoising according to claim 1, wherein a structure of the linear sub-array partition type L-shaped coprime array in step (1) is specifically described as follows: the coprime linear array $\mathbb{L}_i$ forming the L-shaped coprime array is composed of a pair of sparse uniform linear sub-arrays, two sparse uniform linear sub-arrays respectively contain $2M_{\mathbb{L}_1}$ and $N_{\mathbb{L}_1}$ antenna array elements, and array element spacings are respectively $N_{\mathbb{L}_1}d$ and $M_{\mathbb{L}_1}d$; the two sparse linear uniform sub-arrays in $\mathbb{L}_i$ are combined in a form of overlapping the first array elements to obtain the coprime linear array $\mathbb{L}_i$ containing $|\mathbb{L}|=2M_{\mathbb{L}_1}+N_{\mathbb{L}_1}-1$ array elements.

3. The method for estimating a direction of arrival of a sub-array partition type L-shaped coprime array based on fourth-order sampling covariance tensor denoising according to claim 1, wherein, for the fourth-order sampling noise tensor $\mathcal{Z}_{(\tau_1,\varsigma_1,\tau_2,\varsigma_2)}$ described in step (3), the $(\tau, \varsigma)$th elements in $$\hat{v} \in \mathbb{C}^{|\mathbb{L}_1| \times |\mathbb{L}_2| \times |\mathbb{L}_1| \times |\mathbb{L}_2|},$$

are expressed as $g_{(\tau,\varsigma)}$, $h_{(\tau,\varsigma)}$ and $n_{(\tau,\varsigma)}$, $\tau=1, 2, \ldots, |\mathbb{L}_1|$, $\varsigma=1, 2, \ldots, |\mathbb{L}_2|$ respectively, then the $(\tau_1, \varsigma_1, \tau_2, \varsigma_2)$th element in $\mathcal{Z}$ is expressed as follows:

$$\mathcal{Z}_{(\tau_1,\varsigma_1,\tau_2,\varsigma_2)} = (g_{(\tau_1,\varsigma_1)} + h_{(\tau_1,\varsigma_1)} + n_{(\tau_1,\varsigma_1)})(g_{(\tau_2,\varsigma_2)} + h_{(\tau_2,\varsigma_2)} + n_{(\tau_2,\varsigma_2)})^*$$

$$= g_{(\tau_1,\varsigma_1)}g^*_{(\tau_2,\varsigma_2)} + g_{(\tau_1,\varsigma_1)}h^*_{(\tau_2,\varsigma_2)} + g_{(\tau_1,\varsigma_1)}n^*_{(\tau_2,\varsigma_2)} + h_{(\tau_1,\varsigma_1)}g^*_{(\tau_2,\varsigma_2)} +$$

$$h_{(\tau_1,\varsigma_1)}h^*_{(\tau_2,\varsigma_2)} + h_{(\tau_1,\varsigma_1)}n^*_{(\tau_2,\varsigma_2)} + n_{(\tau_1,\varsigma_1)}g^*_{(\tau_2,\varsigma_2)} + n_{(\tau_1,\varsigma_1)}h^*_{(\tau_2,\varsigma_2)} +$$

$$n_{(\tau_1,\varsigma_1)}n^*_{(\tau_2,\varsigma_2)};$$

$g_{(\tau,\varsigma)}$, $h_{(\tau,\varsigma)}$ and $n_{(\tau,\varsigma)}$ respectively obey the approximate complex Gaussian distribution, that is:

$$g_{(\tau,\varsigma)} \sim AsCN\left(0, \frac{1}{T}\sigma_n^2 \sum_{k=1}^{K}\sigma_k^2\right),$$

$$h_{(\tau,\varsigma)} \sim AsCN\left(0, \frac{1}{T}\sigma_n^2 \sum_{k=1}^{K}\sigma_k^2\right),$$

$$n_{(\tau,\varsigma)} \sim AsCN\left(0, \frac{1}{T}\sigma_n^4\right),$$

so $g_{(\tau_1,\varsigma_1)}g^*_{(\tau_2,\varsigma_2)}, g_{(\tau_1,\varsigma_1)}h^*_{(\tau_2,\varsigma_2)}, h_{(\tau_1,\varsigma_1)}g^*_{(\tau_2,\varsigma_2)},$ $$h_{(\tau_1,\varsigma_1)}h^*_{(\tau_2,\varsigma_2)} \sim AsCN\left(0, \frac{1}{T^2}\left(\sigma_n^2\sum_{k=1}^{K}\sigma_k^2\right)^2\right),$$

$g_{(\tau_1,\varsigma_1)}n^*_{(\tau_2,\varsigma_2)}, h_{(\tau_1,\varsigma_1)}n^*_{(\tau_2,\varsigma_2)}, n_{(\tau_1,\varsigma_1)}g^*_{(\tau_2,\varsigma_2)},$ $$n_{(\tau_1,\varsigma_1)}h^*_{(\tau_2,\varsigma_2)} \sim AsCN\left(0, \frac{1}{T^2}\sigma_n^6\sum_{k=1}^{K}\sigma_k^2\right),$$

$$n_{(\tau_1,\varsigma_1)}n^*_{(\tau_2,\varsigma_2)} \sim AsCN\left(0, \frac{1}{T^2}\sigma_n^8\right),$$

$\mathcal{Z}_{(\tau_1,\varsigma_1,\tau_2,\varsigma_2)}$ also obeys the approximate complex Gaussian distribution, and an approximate variance thereof $\overline{\sigma}^2$ is expressed as follows:

$$\overline{\sigma}^2 = \frac{1}{T^2}\left[\lambda_1\left(\sigma_n^2\sum_{k=1}^{K}\sigma_k^2\right)^2 + \lambda_2\sigma_n^6\sum_{k=1}^{K}\sigma_k^2 + \lambda_3\sigma_n^8\right].$$

4. The method for estimating a direction of arrival of a sub-array partition type L-shaped coprime array based on fourth-order sampling covariance tensor denoising according to claim 1, wherein, for the fourth-order virtual domain signal derivation described in step (5), the virtual domain signal $\hat{U}_\mathbb{V} \in \mathbb{C}^{|\mathbb{V}_x| \times |\mathbb{V}_y|}$ corresponding to the virtual uniform cross array $\mathbb{V}$ can be expressed as follows:

$$\hat{U}_\mathbb{V} = \sum_{k=1}^{K}\left(\frac{1}{T}s_k^T s_k^*\right)g_x(k)\cdot g_y(k),$$

wherein:

$$g_x(k) = \left[e^{-j\pi q_{\mathbb{V}_x}^{(1)}\mu_1(k)}, e^{-j\pi q_{\mathbb{V}_x}^{(2)}\mu_1(k)}, \ldots, e^{-j\pi q_{\mathbb{V}_x}^{(|\mathbb{V}_x|)}\mu_1(k)}\right]^T,$$

$$g_y(k) = \left[e^{-j\pi q_{\mathbb{V}_y}^{(1)}\mu_2(k)}, e^{-j\pi q_{\mathbb{V}_y}^{(2)}\mu_2(k)}, \ldots, e^{-j\pi q_{\mathbb{V}_y}^{(|\mathbb{V}_y|)}\mu_2(k)}\right]^T,$$

are steering vectors of $\mathbb{V}_x$ and $\mathbb{V}_y$, respectively.

5. The method for estimating a direction of arrival of a sub-array partition type L-shaped coprime array based on fourth-order sampling covariance tensor denoising according to claim 1, wherein, for the two-dimensional direction of arrival estimation process described in step (7), parameters $\hat{\mu}_1(k)$ and $\hat{\mu}_2(k)$ are extracted from $\{\hat{l}_x(k),\hat{l}_y(k),\hat{v}_x(k),\hat{v}_y(k)\}$:

$$\hat{\mu}_1(k) = \angle\left(\hat{l}_x^T(k)\hat{v}_x(k)/J_x\right)/\pi,$$

$$\hat{\mu}_2(k) = \angle\left(\hat{l}_y^T(k)\hat{v}_y(k)/J_y\right)/\pi,$$

wherein, $\angle(\cdot)$ represents an operation of taking an argument of a complex number; the closed-form solution of the two-dimensional direction of arrival estimation ($\hat{\theta}_k$, $\hat{\varphi}_k$) is obtained according to the relationship between $\{\mu_1(k), \mu_2(k)\}$ and the two-dimensional direction of arrival ($\theta_k$, $\varphi_k$), that is, $\mu_1(k)=\sin(\varphi_k)\cos(\theta_k)$ and $\mu_2(k)=\sin(\varphi_k)\sin(\theta_k)$:

$$\hat{\theta}_k = \arctan\left(\frac{\hat{\mu}_2(k)}{\hat{\mu}_1(k)}\right),$$

$$\hat{\varphi}_k = \sqrt{\hat{\mu}_1(k)^2 + \hat{\mu}_2(k)^2}.$$

6. The method for estimating a direction of arrival of a sub-array partition type L-shaped coprime array based on fourth-order sampling covariance tensor denoising according to claim 1, wherein, in step (7), according to a uniqueness condition of the CPD, the following condition are met for performing the CPD on $\hat{\mathcal{U}}$ :

$$\kappa(\hat{L}_x)+\kappa(\hat{L}_y)+\kappa(\hat{V}_x)+\kappa(\hat{V}_y)\geq 2K+3,$$

wherein, $\kappa(\cdot)$ represents a Kruskal rank of the matrix, $\hat{L}_x=[\hat{l}_x(1), \hat{l}_x(2), \ldots \hat{l}_x(K)]\in \mathbb{C}^{J_x\times K}$, $\hat{L}_y=[\hat{l}_y(1), \hat{l}_y(2), \ldots \hat{l}_y(K)]\in \mathbb{C}^{J_y\times K}$, $\hat{V}_x=[\hat{v}_x(1), \hat{v}_x(2), \ldots \hat{v}_x(K)]\in \mathbb{C}^{J_x\times K}$ and $\hat{V}_y=[\hat{v}_y(1), \hat{v}_y(2), \ldots \hat{v}_y(K)]\in \mathbb{C}^{J_y\times K}$ are factor matrices of $\hat{\mathcal{U}}$ ; $\kappa(\hat{L}_x)=\min(J_x, K)$, $\kappa(\hat{L}_y)=\min(J_y, K)$, $\kappa(\hat{V}_x)=\min(J_x, K)$ and $\kappa(\hat{V}_y)=\min(J_y, K)$ are substituted into an uniqueness conditional inequality of the CPD to obtain $K\leq \lfloor(|\mathbb{V}_x|+|\mathbb{V}_y|-1)/2\rfloor$, where $\lfloor\cdot\rfloor$ represents a round-up operation.

\* \* \* \* \*